United States Patent [19]
Mackinnon

[11] Patent Number: 6,079,314
[45] Date of Patent: Jun. 27, 2000

[54] BEVERAGE BREWER CHAMBER ASSEMBLY

[75] Inventor: Timothy S. Mackinnon, Brossard, Canada

[73] Assignee: Office Perks Gourmet Coffee Service Inc.

[21] Appl. No.: 09/076,831

[22] Filed: May 13, 1998

[30] Foreign Application Priority Data

May 16, 1997 [CA] Canada ................................. 2205627

[51] Int. Cl.⁷ ................................................ A47J 31/00
[52] U.S. Cl. ........................................ 99/289 R; 99/304
[58] Field of Search ............................... 99/279, 289 R, 99/289 D, 292, 283, 287, 300, 302 R, 302 C, 304

[56] References Cited

U.S. PATENT DOCUMENTS

| | | |
|---|---|---|
| 1,869,720 | 8/1932 | Strand et al. . |
| 3,313,332 | 4/1967 | Stephan et al. ................. 146/192 |
| 3,683,790 | 8/1972 | Black et al. .................... 99/289 |
| 3,973,623 | 8/1976 | Sarll ............................. 165/94 |
| 4,271,753 | 6/1981 | Neely ........................... 99/289 R |
| 4,305,328 | 12/1981 | Kueser et al. .................. 99/283 |
| 4,476,776 | 10/1984 | Greutert et al. ............... 99/302 C |
| 4,791,859 | 12/1988 | King ............................ 99/289 R |
| 5,309,820 | 5/1994 | Baxter et al. .................. 99/280 |
| 5,312,637 | 5/1994 | Midden ........................ 426/433 |
| 5,351,604 | 10/1994 | King et al. ................... 99/289 R |
| 5,406,882 | 4/1995 | Shaanan ........................ 99/287 |

*Primary Examiner*—David Lacey
*Assistant Examiner*—Drew Becker
*Attorney, Agent, or Firm*—Ronald S. Kosie; Robert Brouillette; Nicolas Pellemans

[57] ABSTRACT

Assemblies, systems, and devices are provided for the brewing of a beverage (e.g. coffee, or tea). The invention, in particular, provides a brew chamber assembly for an apparatus for preparing a beverage from an aqueous medium and a particulate beverage material; the chamber assembly may, for example, be used in automated beverage making machines. The brew chamber assembly may comprise a brewing vessel and a spent coffee grounds discharge mechanism. The brewing vessel comprises a floor and side wall elements. The spent particulate beverage material discharge mechanism comprises an exit element for venting spent particulate beverage material out of the brewing vessel and a spinable impellor for urging spent particulate beverage material out of the brew chamber through the exit element.

53 Claims, 11 Drawing Sheets

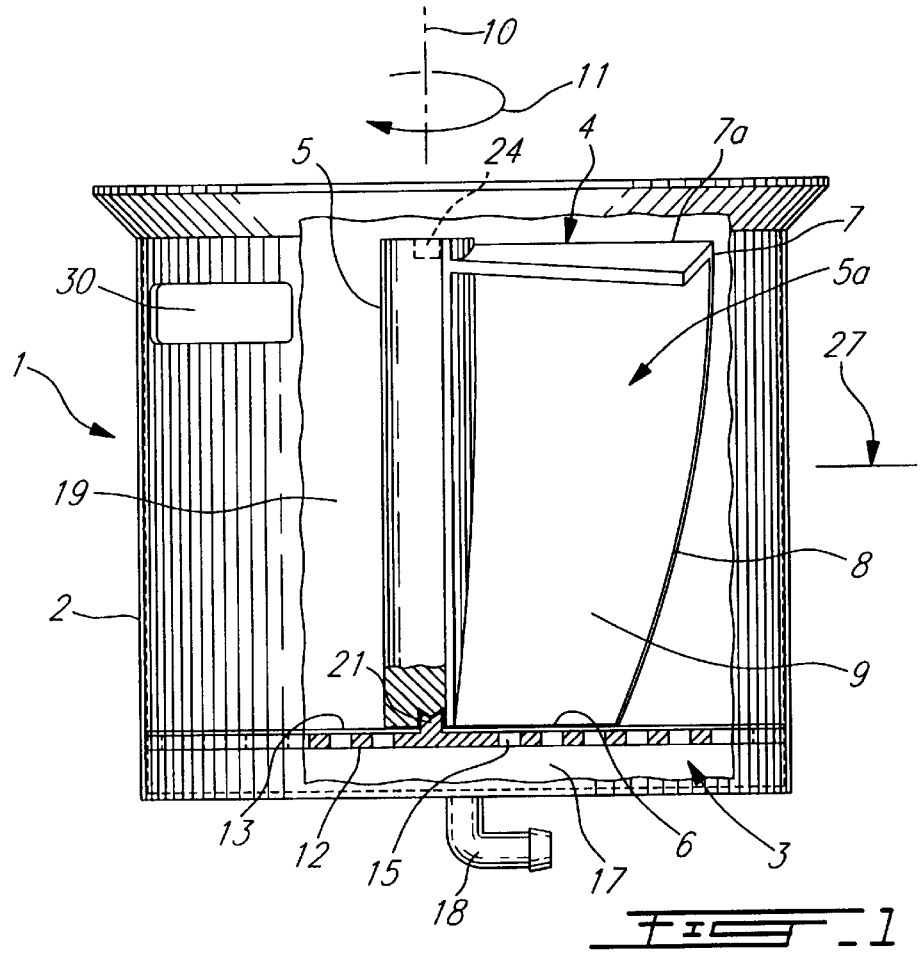
FIG_1
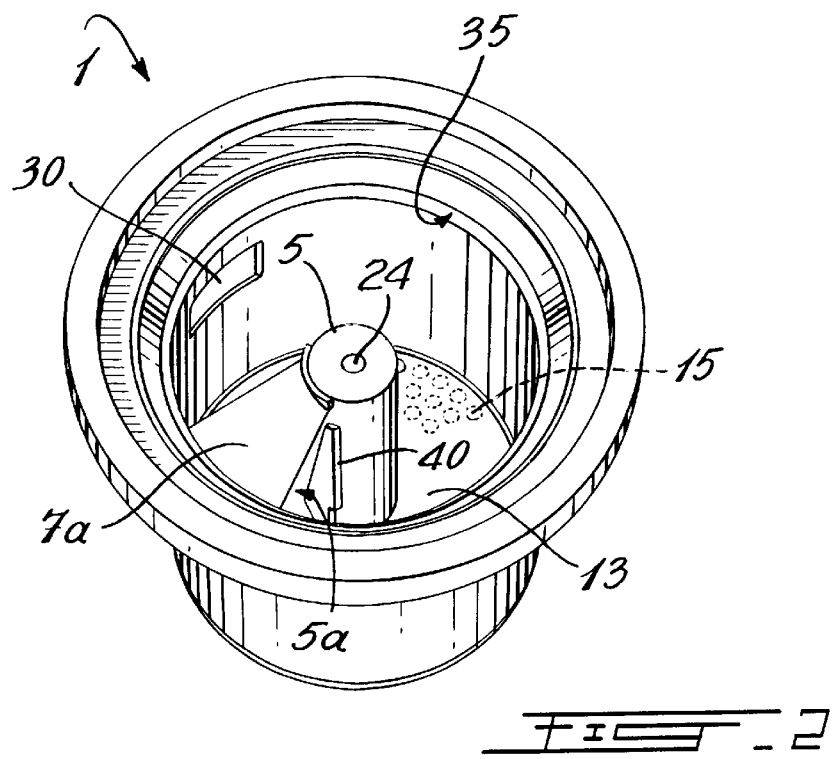
FIG_2

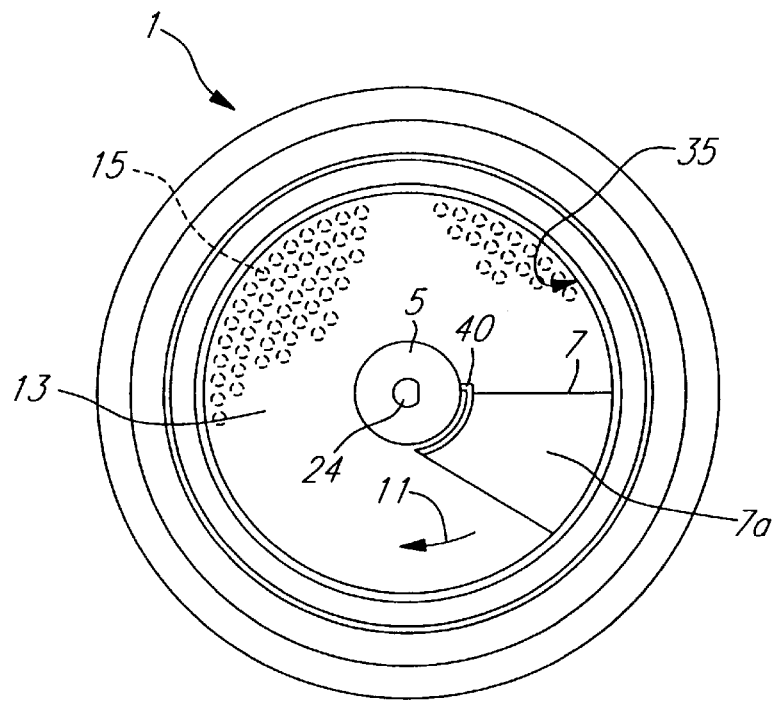
FIG_3
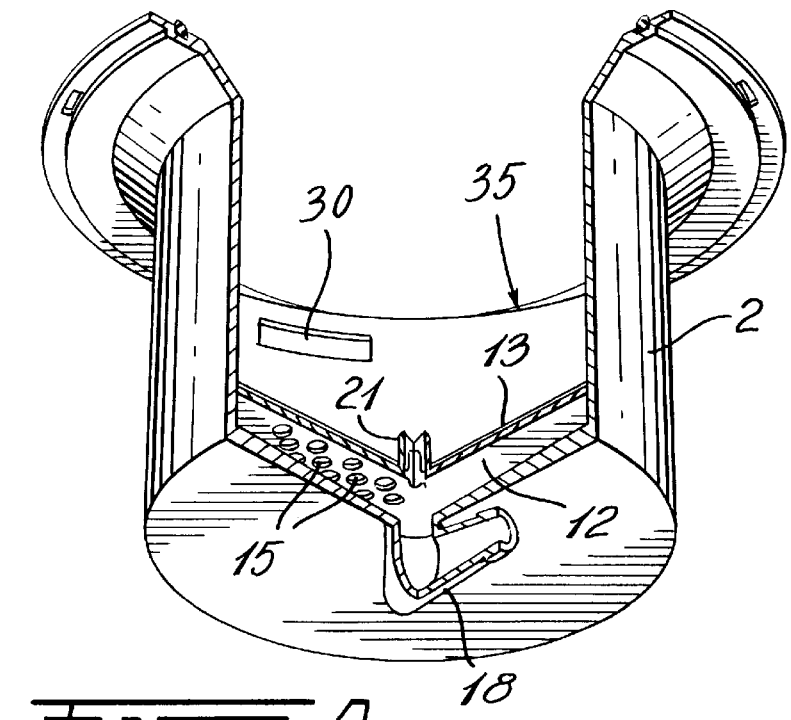
FIG_4

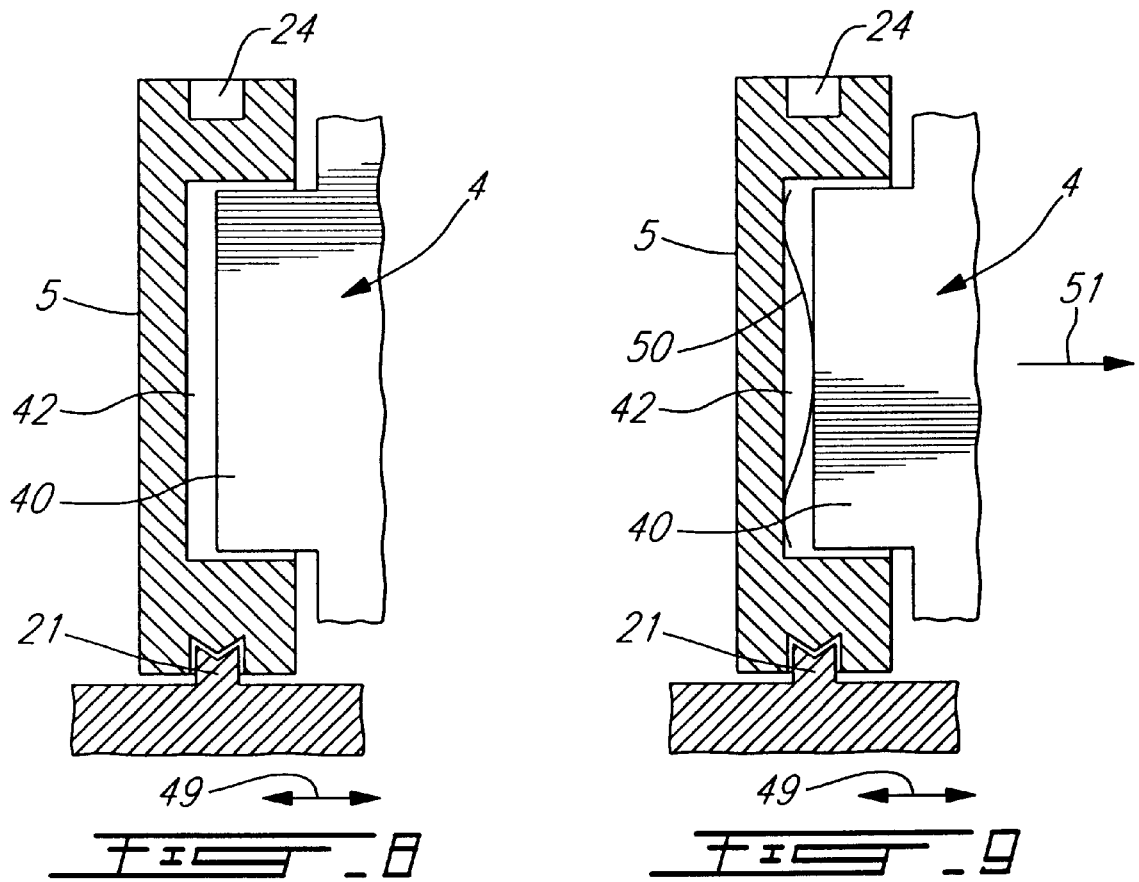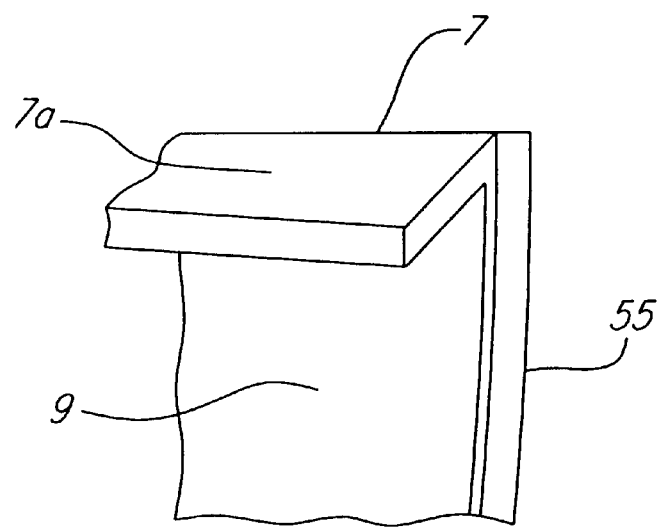

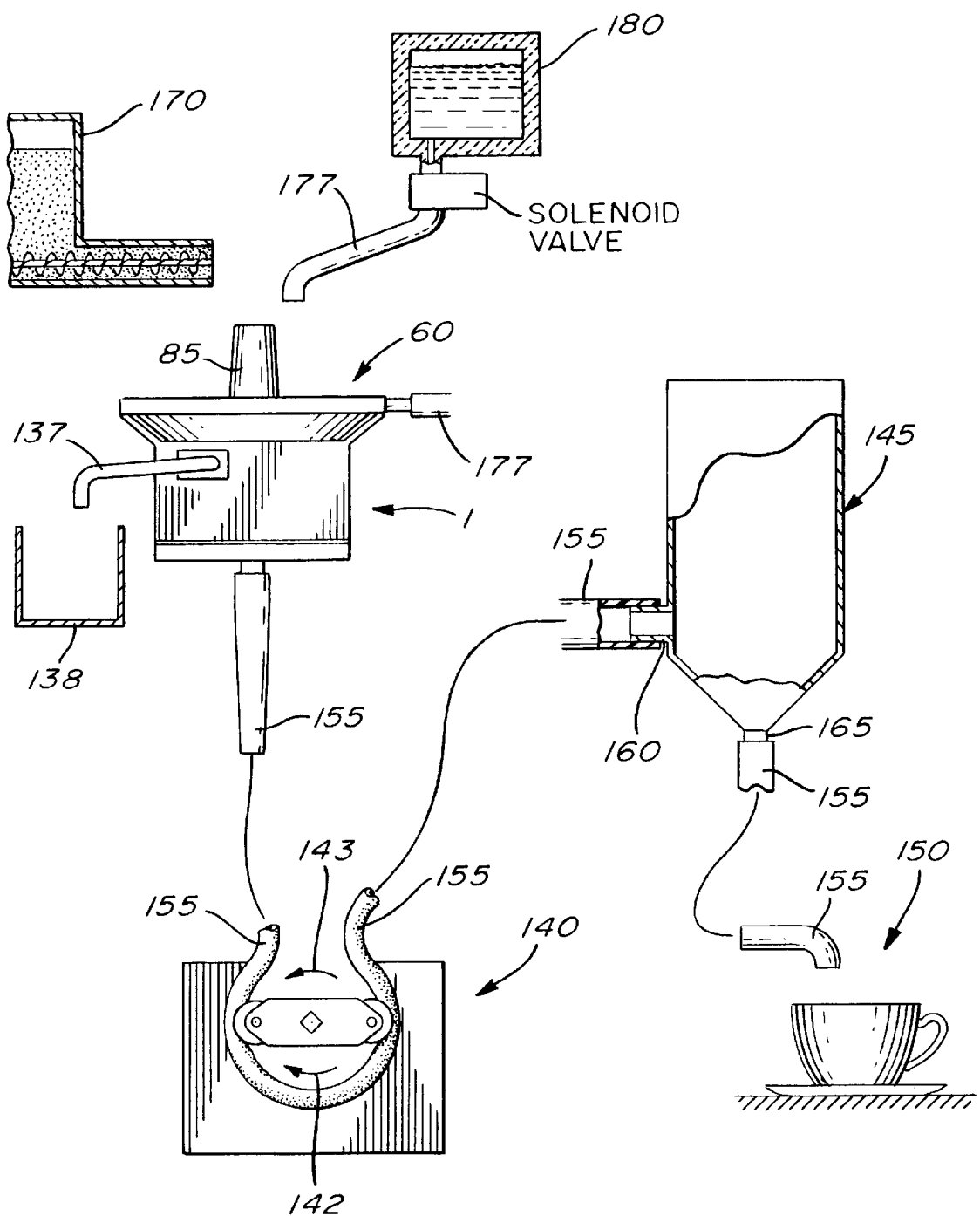

BEVERAGE BREWER CHAMBER ASSEMBLY

BACKGROUND

The present invention relates to assemblies, systems, devices and the like for the brewing of a beverage; the invention may, for example, be used in automated beverage making machines and the like. The beverage may be brewed from an aqueous medium and an insoluble particulate beverage material (for example, from hot water and a coffee material, a tea material or the like). The invention in particular relates to means for discarding spent particulate beverage material from a brewing vessel. The following unless otherwise indicated will in particular describe the invention in relation to coffee making but it is to be understood that the invention may be applied to the making of infusions from other types of particulate beverage material (e.g. tea).

Coffee making devices are known which employ some type of mechanism for the removal of spent coffee grounds from the brewing vessel. Systems are known, for example, which require a two part brewing vessel wherein a floor component, which acts as a filter means for separating the beverage from the insoluble spent particulate material, is separable from the rest of the brewing vessel in order to permit removal of the spent coffee grounds from the floor. Such splitable brewing vessels are for example exploited with brewing devices of the piston cylinder type. For these type of brewers it is known, for example, to use a band of disposable filter paper in conveyor like fashion as part of the filtering mechanism, to scrap the spent coffee grounds off of the filter floor, etc. These type of systems due to the use of a splittable brewing vessel, a piston/cylinder mechanism, etc. are relatively mechanically complicated insofar as the separation of the spent or waste coffee grounds is concerned. In particular, a number of drawbacks and limitations are associated with piston/cylinder type combinations for coffee brewers, namely: a relatively large number of moving parts are associated with the separation of the two components of the brewing vessel. Accordingly, close attention must be paid to the repair and upkeep of the mechanism; more particularly, should the suction and compression characteristic of the system fall below that which is required, an expert repair person is needed in order to dismantle and rebuild the mechanism to replace or repair the piston/cylinder combination.

Various known types of brewing device are, for example, described in the following: U.S. Pat. Nos. 3,369,478, 3,565,641, 3,683,790, 4,271,753, 4,305,328, 4,791,859, 5,309,820, 5,312,637, 5,351,604, and 5,406,882.

Accordingly, it would be advantageous to have an assembly for a brewing apparatus having a mechanically simple spent particulate removal mechanism, i.e. a system which relies on a relatively low number of moving parts to achieve removal of spent coffee grounds from a brewing vessel. It in particular would be advantageous to have a brewing assembly which could exploit a brewing vessel which would not have to be splittable so as to expose spent particulate beverage material left on a filter floor.

SUMMARY OF INVENTION

The present invention in accordance with a general aspect relates to a brew chamber assembly for an apparatus for preparing a beverage from an aqueous medium and a particulate beverage material.

said brew chamber assembly comprising a brewing vessel and spent particulate beverage material discharge means, said brewing vessel comprising side wall means and a floor, said spent particulate beverage material discharge means comprising exit means for venting spent particulate beverage material out of said brewing vessel and spinable impellor means for urging spent particulate beverage material out of said brewing vessel through said exit means, said brewing vessel and said spinable impellor means being configured such that when the impellor means is spun, in the brewing vessel, in a working direction, about an axis of rotation, the impellor means is able to induce spent particulate beverage material in said brewing vessel to move outwardly away from the axis of rotation and upwardly away from the floor so as to urge spent particulate beverage material out of said brewing vessel through said exit means.

In accordance with the present invention, a brew chamber assembly may comprise beverage evacuation means for the evacuation of beverage from said vessel so as to leave spent particulate beverage material behind in said vessel. The beverage evacuation means may take on any suitable or required form. The floor of the brewing vessel may for example form part of the beverage evacuation means. In this case, at least a portion of the floor may be configured as a filter for the evacuation of beverage from the brewing vessel so as to leave spent particulate beverage material (e.g. spent coffee grounds) behind on the floor. The floor may, for example, comprise a micromesh filter screen for recovering beverage from said vessel, said filter screen being permeable to air.

A brew chamber assembly of the present invention may, for example, be used as part of a system or an apparatus for preparing a beverage from an aqueous medium and an insoluble particulate beverage material which for example operates with a brewing cycle including air agitation of an (infusion) mixture of the aqueous medium and the particulate beverage material in brewing vessel. Accordingly, the floor of a brewing vessel may define a top wall of a lower compartment. At least a portion of the top wall of the lower compartment may be configured so as to act as a filter for the evacuation of beverage from the vessel as well as being permeable to air. The lower compartment may have opening means for the entry of air thereinto and for the exit of beverage therefrom; air passing into the compartment may be passed on through the air permeable top wall into the brewing vessel for agitation of a (infusion) mixture therein. Thus for example, the top wall may comprise a perforated base and filter means for recovering beverage from the brewing vessel, the filter means being permeable to air and covering the perforations of the base. The filter means may comprise a micromesh filter screen for recovering beverage from said vessel, wherein said top wall comprises a perforated base and filter means for recovering beverage from said vessel, said filter means being permeable to air and covering the perforations of said base and wherein filter means comprises a micromesh filter screen for recovering beverage from said vessel, said filter screen being permeable to air, filter screen being permeable to air. For more detail with respect to air agitation see U.S. Pat. No. 5,309,820.

A system in accordance with the present invention, may, for example, comprise a brewing vessel comprising side wall means and a floor, said floor defining a top wall of a lower compartment, at least a portion of said top wall being configured as a filter for the evacuation of beverage from said vessel so as to leave spent particulate beverage material behind on said floor and being permeable to air, said compartment having opening means for the entry of air thereinto for agitation of said mixture and for the exit of beverage therefrom, means for supplying particulate beverage material into said brewing vessel means for supplying an aqueous medium into said brewing vessel fluid displacement means for withdrawing obtained beverage from the brewing vessel through said floor so as to leave spent particulate beverage material (e.g. spent coffee ground) behind on said floor, spent particulate beverage material discharge means comprising exit means for venting spent particulate beverage material out of said brewing vessel and spinable impellor means for urging spent particulate beverage material out of said brewing vessel through said exit means, said brewing vessel and said spinable impellor means being configured such that when the impellor means is spun, in the brewing vessel, in a working direction, about an axis of rotation, the impellor means is able to induce spent particulate beverage material in said brewing vessel to move outwardly away from the axis of rotation and upwardly away from the floor so as to urge spent particulate beverage material out of said brewing vessel through said exit means.

A brew chamber assembly of the present invention may, in particular, be used as part of an apparatus for preparing a beverage from an aqueous medium and a particulate beverage material, said apparatus having a brewing vessel comprising side wall means and a floor, said floor defining a top wall of a lower compartment, at least a portion of said top wall being configured as a filter for the evacuation of beverage from said vessel so as to leave spent particulate beverage material behind on said floor and being permeable to air, said compartment having opening means for the entry of air thereinto and for the exit of beverage therefrom supply means for supplying aqueous medium and said particulate beverage material to said vessel, fluid displacement means for forcing air into the brewing vessel through said floor and for withdrawing obtained beverage from the brewing vessel through said floor, a dispensing station for dispensing the obtained beverage spent particulate beverage material discharge means comprising exit means for venting spent particulate beverage material out of said brewing vessel and spinable impellor means for urging spent particulate beverage material out of said brewing vessel through said exit means, said brewing vessel and said spinable impellor means being configured such that when the impellor means is spun, in the brewing vessel, in a working direction, about an axis of rotation, the impellor means is able to induce spent particulate beverage material in said brewing vessel to move outwardly away from the axis of rotation and upwardly away from the floor so as to urge spent particulate beverage material out of said brewing vessel through said exit means, and control means for controlling the supply means, said fluid displacement means and said spent particulate beverage material discharge means to effect a brewing cycle, said brewing cycle comprising supplying aqueous medium and particulate beverage material to the brewing vessel, forcing air through said floor to agitate a mixture of beverage material and aqueous medium in the brewing vessel, drawing the obtained beverage from the vessel through said floor, and venting spent particulate beverage material out of said brewing vessel, and wherein the fluid displacement means comprises one or more pump means, at least one said pump means being operatively connected to said opening means of said compartment and to an air source for forcing air through said common wall into said vessel, at least one said pump means being operatively connected to said opening means of said compartment and to the dispensing station for withdrawing obtained beverage from the vessel through said top wall for delivery to said dispensing station, and said control means includes means for selectively activating said pump means to force air into said brewing vessel through said common wall, for selectively activating said pump means for withdrawing beverage from said vessel through said top wall and for selectively activation said spinable impellor means for centrifugally pumping spent particulate beverage material out of said brewing vessel.

A brew chamber assembly, as mentioned above, in accordance with the present invention is provided with said spent particulate beverage material (e.g. coffee grounds) discharge means.

The discharge means comprises exit means for venting spent particulate beverage material out of the brewing vessel. The discharge means also comprises spinable impellor means configured for urging spent particulate beverage material out of the brew chamber through exit means.

Turning first to the exit means, it may take on any suitable or required form keeping in mind the purpose thereof, i.e. to provide a path whereby the spent particulate beverage material may be vented out of the brewer vessel due to the urging action of the spinable impellor means.

The exit means may for example comprise one or more side openings defined by the side wall means of the brewing vessel. A side opening may, advantageously, be disposed so as to be above a brewing level for the brewing vessel. In this case, it is possible to leave the side opening unblocked during the entire brewing cycle, i.e. it is possible to avoid the use of a plug mechanism for plugging the opening so as to inhibit the escape of liquid medium and particulate beverage material during the steeping or soaking step during which beverage substance(s) is/are extracted into the aqueous medium. It is to be understood herein that, for any given size brewing vessel, the expression "brewing level" is a reference to a predetermined maximum level for the steeping mixture in the vessel for which the vessel is intended to be used, i.e. a reference to a predetermined maximum volume of steeping mixture in the vessel. The higher the side opening is above the brewing level the less likely it will be necessary to have to use a plug mechanism to avoid undesired spillage of steeping mixture out of the brewing vessel during the steeping step; advantageously the side opening is sufficiently high above the brewing level so as not to need a plug mechanism. In any event, if desired or required, the exit means may comprise plug means displaceable between a plug configuration or position wherein the side opening is blocked for inhibiting the passage therethrough of aqueous medium and particulate material and an open configuration or position for venting spent particulate beverage material out of the brewing vessel through said side opening; the plug means may be activatable by means of a suitable motor drive or solenoid mechanism able to displace the plug means between said configuration. Such a plug mechanism would be necessary, for example, if the side opening is disposed so as to be below the brewing level of the brewing vessel. In either case the exit means may be configured and/or disposed so as to avoid undesired release of the steeping mixture during the steeping step. A side opening would in particular favour the exploitation of the centrifugal action of the spinable impellor means relative to the spent particulate beverage material, i.e. the tendency of the particles of beverage material to move away from the axis of rotation of the spinning impellor means (see below).

Alternatively, the brewing vessel may be provided with a top cap means configured to provide selective access to and from the interior of the brewing vessel during a brewing cycle. In this case after the beverage is removed from the brewing vessel one or more top openings may be provided in the cap which is in communication with an exit path means for leading the spent particulate beverage material to a waste storage container or basket. In this case, the spinable impellor means would in relation to the venting of spent particles, be configured to favour upward movement of the spent particulate beverage material, i.e. the impellor means would not, for example, be provided with a deflector means for deflecting particles toward the side wall means of the brewing vessel; the inducing of this type of movement will be discussed in more detail below with respect to the spinable impellor means. For this type of exit mechanism, the top cap may be provided with a supply opening(s) for the introduction of aqueous medium and particulate beverage material which may be selectively blocked off by suitable plug means during venting of the spent particulate beverage material; the plug means may be activatable by means of a suitable motor drive or solenoid mechanism able to displace the plug means between a plugging position and a retracted open position.

As mentioned above, the discharge means also comprises spinable impellor means configured for urging spent particulate beverage material out of the brewing vessel through exit means. The spinable impellor means (along with the brewing vessel) is configured such that when the impellor means is spun in the brewing vessel, about an axis of rotation in a working direction, the impellor means is able to induce spent particulate beverage material in said brewing vessel to move outwardly away from the axis of rotation and upwardly away from the floor so as to urge spent particulate beverage material out of said brewing vessel through said exit means; in other words the impellor means may provide a spent particle with a radially outward movement vector and a rising movement vector either or both of which may be exploited to direct the particle out of the brewing vessel via exit means (e.g. via an exit or venting opening). The action of the spinable impellor means relative to the spent particulate beverage material thus in one aspect, for example, provides a centrifugal movement component, i.e. a centrifugal like pumping action for urging spent particulate beverage material out of said brew chamber through an (side wall) the exit. The addition of the upward movement vector may thus generate a swirling air suspension of spent particulate beverage material in the brewing vessel.

The impellor means may comprise one or more impellor blades which may suitably engage and be suitably distributed about a hub which is rotatable in the vessel about an axis of rotation. The impellor means may be spun or rotated about the axis of rotation by any suitable means e.g. by an electric motor. It is to be understood herein that the expression "in a working direction" including similar expression characterises the direction of rotation of the impellor means (e.g. including the hub) as being a direction which will result in the impellor means being able to induce spent particulate beverage material to move outwardly away from the axis of rotation and upwardly away from the vessel floor.

The impellor blades may take on any suitable or desired form and may also engage the hub in any suitable manner keeping in mind the purpose thereof, namely the ability to induce particles to move outwardly away from the axis of rotation and upwardly away from the vessel floor when the impellor means is spinning or whirling about the axis of rotation in the brewing vessel. Thus, keeping in mind the amount and type of particles to vent, the dryness of the particles, the form of the brewing vessel, the height of the exit means relative to the floor, etc. the necessary, desired or required form of the impellor blades and a suitable rotational speed for the impellor means may be predetermined by appropriate experimentation. The blade body of an impellor blade may be perforate or imperforate; the blade body may on the side in the working direction have a flat working surface, a concave working surface (e.g. inwardly curved plow like surface), etc. The blade body may be disposed so as to present a surface in the working direction of rotation which may generally be sloped form the lower edge away from such direction, i.e. the blade body may have a lower edge which in the working direction is ahead of or leading an upper trailing edge as the impellor rotates; in this case the working surface of the blade body may along with the surface of the floor define an angle of, for example, greater than 90° and less than 180° (see angle $\alpha$ in FIG. 6).

Thus, the spinable impellor means may comprise a hub rotatable about the axis of rotation and an impellor blade engaging the hub. The impellor blade may comprise a radially extending imperforate blade body, the brewing vessel and the blade body being configured such that when the hub is spun, in the brewing vessel, about the axis of rotation in said working direction, the blade body, is able to induce spent particulate beverage material to move outwardly away from the axis of rotation and upwardly from the floor.

When appropriate or desired the impellor means may comprise particulate deflection means. The deflection means may extend from said imperforate blade body and may be disposed and configured in any suitable or desired manner such that when the hub is spun about the axis of rotation in said working direction, the deflection means is able to deflect spent particulate beverage material to the exit means (e.g. to a side opening defined by said side wall means whereby spent particulate beverage material may be vented out of the brewing vessel). The deflection means may for example take the form of a lip projection which may extend, for example, from the upper edge of the blade body.

As mentioned above, a blade body may comprise a lower leading edge, and an upper trailing edge. The blade body may also have a radial outer side edge disposed between the upper and lower edges which is configured for sweeping spent particulate beverage material off of the side wall means. In this case a deflection means may, for example, also be present and extend from the said upper trailing edge.

The impellor means may be configured in any suitable fashion such that the side edge may sweep the surface of the side wall means during spinning of the impellor means. For example, the blade body may be fixed to a hub and the radial outer side edge may be defined by a flexible wiper strip made of some suitable rubber material or the like which may yielding engage the side wall surface. Alternatively, the impellor means may be configured such that the blade body or at least a portion of said blade body has a radial freedom of movement between an extended position wherein the side edge engages the side wall means and a retracted position wherein the side edge is spaced apart from the side wall means. For this purpose, the impellor means may be configured such that when the impellor means is spun, the centrifugal force induced, urges the side edge to the extended position.

Alternatively, the impellor means may comprise spring bias means which biases the blade body or portion thereof, in said extended position.

The lower edge of a blade body may likewise be configured so as to sweep the floor of spent particulate beverage material. For example the blade body may have a plow like form such that the rotation of the blade body causes the lower leading edge to initially lift up the spent particles form the floor of a brewing vessel, i.e. once the beverage is separated from the spent particulate material. Thereafter the blade body may induce the above mentioned radial sideways and upward movement.

If desired the lower (leading) edge need not sweep or engage the floor so as to initiate movement of the spent particles. As described herein a brewing cycle may include the air agitation of a mixture of the aqueous medium and the particulate beverage material in the brewing vessel. In this case, after the beverage has been withdrawn from the vessel air may be forced back up into the particles on the floor of the vessel with sufficient force so as to lift the particles off of the floor at or before initiating spinning of the impellor means; once lifted off of the floor the impellor means will induce the above mentioned radial and upward movement of the particles.

Advantageously, in order to ensure that the infusion mixture in the vessel has a homogeneous character, the impellor means may comprise a single impellor blade having an imperforate blade body. If two or more imperforate bodies are present they may divide the vessel volume into a plurality of separate chambers each of which, during the infusion step, may having a different infusion or steeping mixture composition, i.e. the particulate beverage material may not be leached in a homogeneous fashion. If two or more impellor blades are to be used then advantageously only one is imperforate and the others are perforate so as to allow for a relatively homogeneous steeping mixture, i.e. so that the various compartments are in mixture communication.

The brewing vessel itself may take any form whatsoever, provided that it is able to fulfill its function including; to (sufficiently) contain the brewing ingredients during the brewing period while allowing air to enter the vessel for agitation and allowing beverage to leave the vessel; and to cooperate with impellor means to facilitate the above described radial and upward movement of particles. The brewing vessel may, for example, take on the aspect of a tubular member i.e. namely an open ended tubular member cooperating with a fluid permeable floor member to define the brewing vessel.

The tubular member may have an upper opening therethrough of cylindrical configuration with an essentially circular cross section. The tubular member may be a hybrid form. Thus, for example, the inner surface of the tubular member need not, be of constant cross-section. The tubular means may, for example, have a funnel (e.g. conical cross-sectional configuration) shaped upper inner surface the apex or vertex thereof being connected to the floor member through a transition portion having, for example, a cylindrical form cooperating with the impellor means to facilitate the above described radial and upward movement of particles form as described above. In any event the form of the brewing vessel (i.e. inner surface) is to be chosen on the basis that it is able to cooperate with the spinable impellor means such that when the impellor means is spun, in the brewing vessel, in a working direction, about an axis of rotation, the impellor means is able to induce spent particulate beverage material to move outwardly away from the axis of rotation and upwardly away from the floor.

A brew chamber assembly of the present invention may as mentioned above be used as part of a system or an apparatus for preparing a beverage from an aqueous medium and an insoluble particulate beverage material which operates with a brewing cycle including air agitation of an (infusion) mixture of the aqueous medium and the particulate beverage material in the brewing vessel. Such air agitation may be achieved by using fluid displacement means which may not only be able to force air into the brewing vessel through the vessel floor but also be able to withdraw obtained beverage from the brewing vessel through said floor; see the above mentioned U.S. Pat. No. 5,309,820.

The above mentioned fluid displacement means may comprise any suitable type and number of pump(s). It may for example comprise one or more positive displacement rotary pump means, each said pump means having a flexible pumping member.

The positive displacement rotary pump means exploitable to the context in the present invention are those rotary pump means, the pump element(s) of which has a flexible or elastic pumping member which contacts the fluid being displaced; for the purposes herein the expression "a flexible (or elastic) pumping member" or the like shall be understood as referring to rotary pumps means wherein the elastic deformation of an elastic pumping member induces fluid displacement. The rotary pump means of course include the usual (known) motor and other mechanical/electrical elements (e.g. gear reduction elements, rotational speed variation means, etc.) for the operation of the pump element.

A generally known class of preferred (rotary) pump elements which may be used in accordance with the present invention are the peristaltic pumps. The peristaltic pumps may be chosen from among the known available formats, provided of course that the pump(s) chosen are adapted to carry out the function of delivering air to and of evacuating the beverage from the brewing vessel through the permeable floor of the brewing vessel; the tube member should also be of a material acceptable for the transport of a product destined to be consumed by a human being. Thus, for example, the peristaltic pump may be model "series 9×9" from ANKO Products Inc., Pump Division, Bradentan, Fla. U.S.A.; a peristaltic pump is described in U.S. Pat. No. 4,909,136.

In addition to peristaltic pumps, other flexible member pumps may be used which take the form of flexible vane pumps or flexible liner pumps. An example of a flexible liner pump (i.e. an orbital lobe pump) is shown in U.S. Pat. No. 3,537,384. These other types of pumps are also to be chosen on the basis that they must be suitable for the purposes herein.

In accordance with the present invention, fluid displacement means of the present invention may be coupled to the fluid permeable floor of the brewing vessel via the compartment in any suitable manner whatsoever. In this respect the compartment may take any suitable form whatsoever provided that opening means are provided which respect to the required air and beverage flow.

For example, two rotary pump means may be separately connected to the compartment; in this situation each of the pump elements of a respective pump means may be activated selectively such that only one pump element operates at a time, e.g. one of the pump elements may force air into the brewing vessel while the other is inoperative and when the air pump element is inactive the other beverage pump may activated for withdrawing beverage from the vessel.

Preferably, however, the fluid displacement means comprises a reversible rotary pump means having a single pump element (in addition to the usual motor element for the activation of the pump element), this pump means being operatively connected on one side thereof to the vessel floor via the compartment opening and on the other side thereof to an air source and to a dispensing station.

In accordance with the present invention air diffuser means may be disposed in the lower compartment. The air diffuser means may be configured so as to break up or blunt any jet of air so that the air impinges the filter floor as a disturbed mass which is not (so) concentrated but (more) spread out over the surface of the filter floor. The air diffuser means may take any form whatsoever keeping the above in mind and that it is not to trap or interfere with the evacuation of beverage. The air diffuser means may for example take the form of a plate, with numerous holes.

As mentioned above the floor of the brewing vessel may be configured as a filter for the evacuation of beverage form the brewing vessel, the floor also being permeable to air. The filter element may be in the form of a micro mesh screen or any other known filter material suitable for filtering the brewed beverage. The floor may comprise a replaceable or permanent (micro) mesh screen which acts as both a support for the particulate beverage material (e.g. coffee grounds) and as a filter material thus eliminating the need for the perforated support plate. In any event as is known the mesh size of the filter element should preferably be such that:

- it prevents or inhibits the used beverage material (e.g. coffee grounds) from falling through into the compartment and thus into the delivered coffee drink;
- it allows the principle of surface tension to operate so that the hot water does not undesirably penetrate the filter until at least the predetermined leaching/dissolving process has been completed;
- it permits the flow of coffee beverage through the filter when encouraged by the creation of a vacuum on the downstream side of the floor;
- etc . . .

Supply means for supplying aqueous medium and said particulate beverage material to brewing vessel, as well as other components of a beverage brewing system or apparatus (such as conventional coffee cup dropper mechanism, dispensing stations, etc.) are known in the art and will thus not be described herein in particular detail. The supply means may thus include a particulate beverage material (e.g. coffee) dispenser (for adding measured amounts of material to the brewer vessel) which may take the form of a hopper and a cylindrical spout, the mouth of the spout being disposed over the mouth of the brewer chamber. A suitable conveyor screw may be disposed so as to have a part in the spout and another part extending into the particulate material (e.g. coffee grounds) in the hopper; the screw, which may be in the form of an archimedes screw, may be turned by a suitable motor (controlled by a timer mechanism determining the duration of operation of the screw motor) to displace a measured amount of coffee into the brewer chamber. The supply means may also include any suitable means for introducing measured amounts of hot water suitable for brewing into the brewing vessel. The supply means may of course include means for providing hot water e.g. the water may have a temperature ranging from 195 to 200° F.; however, lower temperatures may be used provided that the desired brewing effect still occurs. The hot water dispenser may be of conventional form; the admission of hot water may for example be controlled by a suitable solenoid valve in conjunction with any (known) suitable timer mechanism.

Generally, the control means may comprise any suitable conventional mechanism for activating and controlling the various members; such means are known in the art and will thus not be particularly described herein. The control means for example include means for selectively activating the pump means to force air into the brewing vessel through the floor and for selectively activating the pump means for reverse operation for withdrawing beverage from the brewing vessel through the floor for delivery to a dispensing station. The control means may, for example, comprise any suitable timer control mechanisms for controlling in a timed brewing cycle sequence the amount of coffee grounds used, the amount of water used, the start and duration of air agitation, the start and duration of beverage suction and, if desired, the start and duration of air backflow for loosening the used coffee ground residue on the filter element.

In drawings which illustrate example embodiments of the present invention:

FIG. 1 is a partially cut away schematic side view of a brew chamber assembly of the present invention;

FIG. 2 is a top perspective view of the brew chamber assembly shown in FIG. 1;

FIG. 3 is a top view of the brew chamber assembly shown in FIG. 1;

FIG. 4 is a partially cut away schematic bottom view of the brewing vessel of the brew chamber assembly shown in Figure;

FIG. 8 is a partial schematic side view of the hub and impellor blade of the brew chamber assembly shown in FIG. 1 wherein the hub is longitudinally cut away to expose the engagement slot for slidably engaging the tab member of the impellor blade;

FIG. 9 is a partial schematic side view of a modified version of the hub and impellor blade shown in FIG. 9 wherein the engagement slot of the hub is provided with a bias spring;

FIG. 10 is a partial schematic view of a modified version of the impellor blade shown in FIG. 2 wherein the radial edge is provided with a rubber like wiper blade member;

Figure 11:
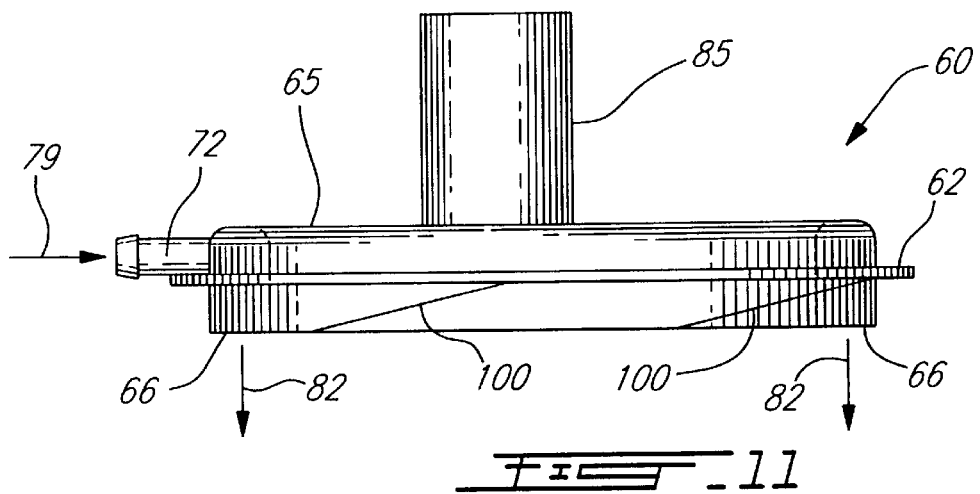
Figure 12:
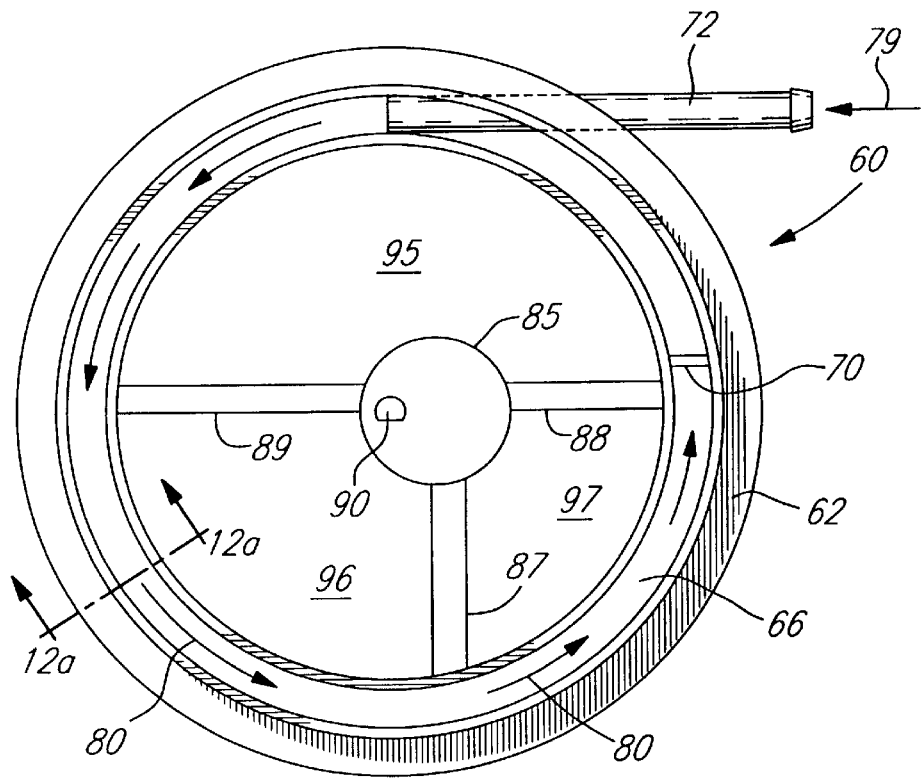
Figure 12A:
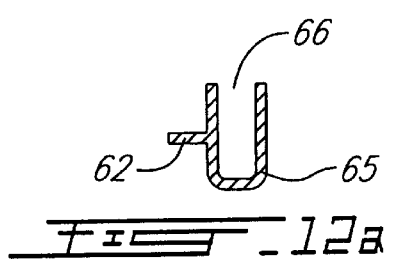
Figure 13:
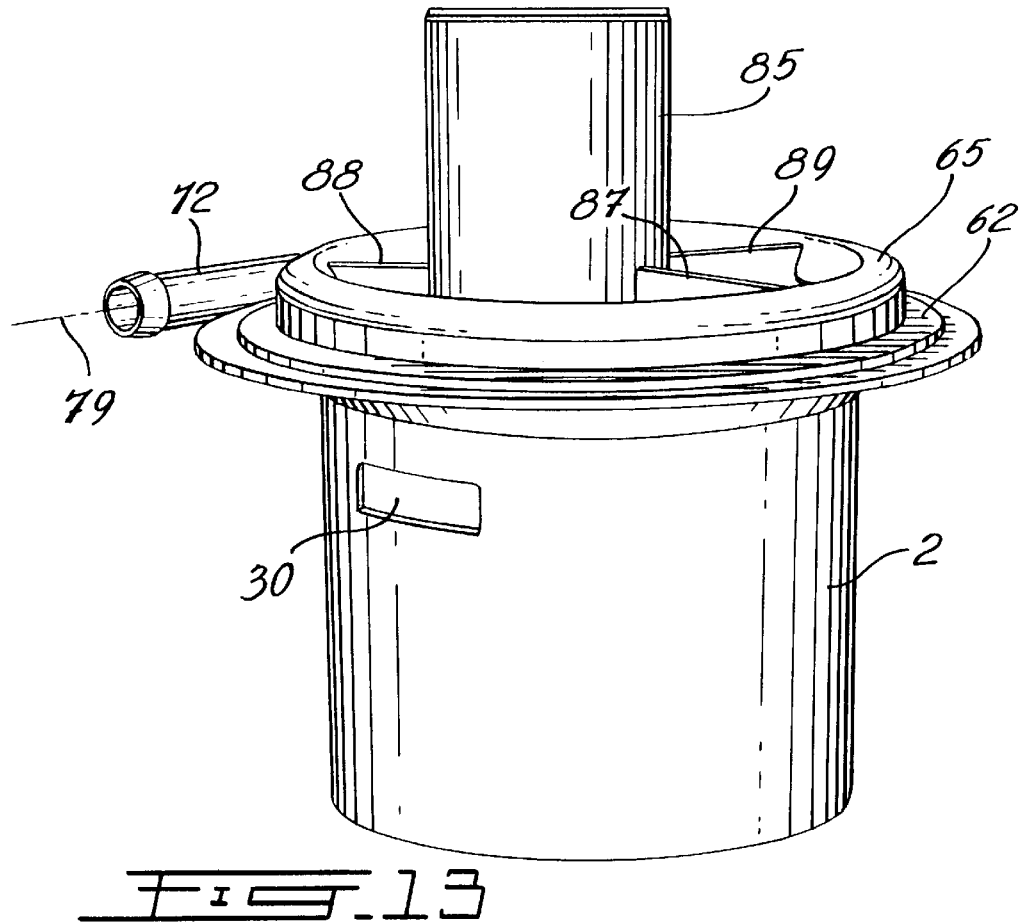
Figure 14:
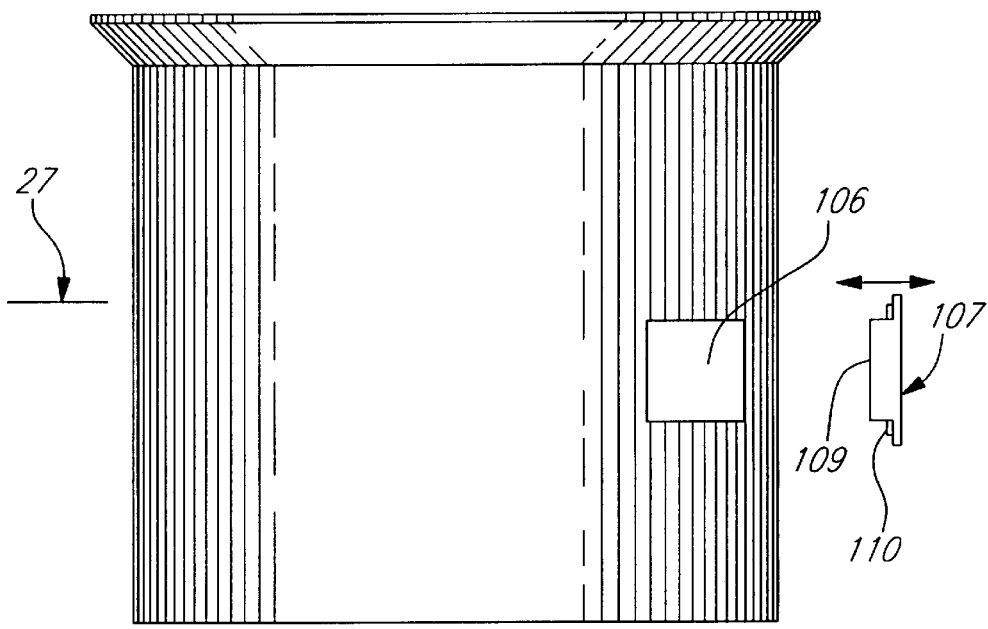
Figure 15:
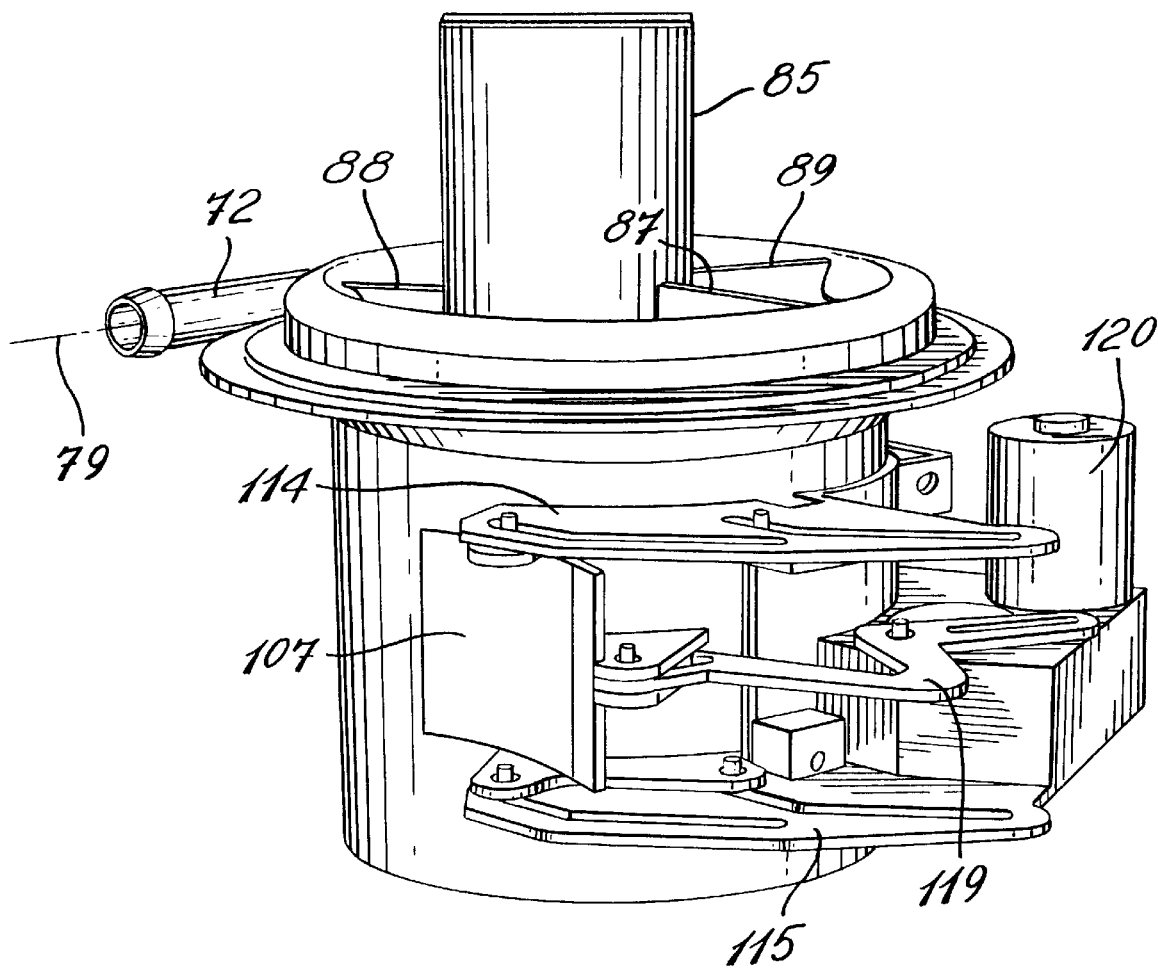
Figure 16:
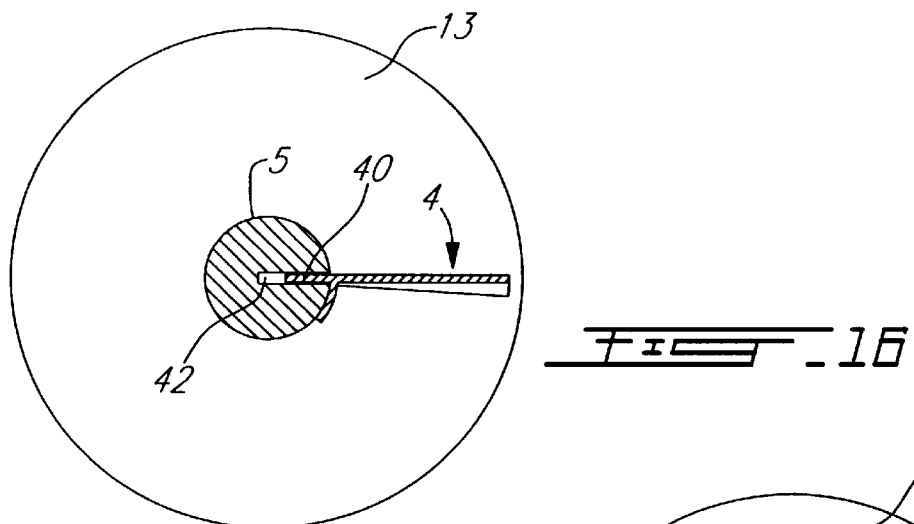
Figure 17:
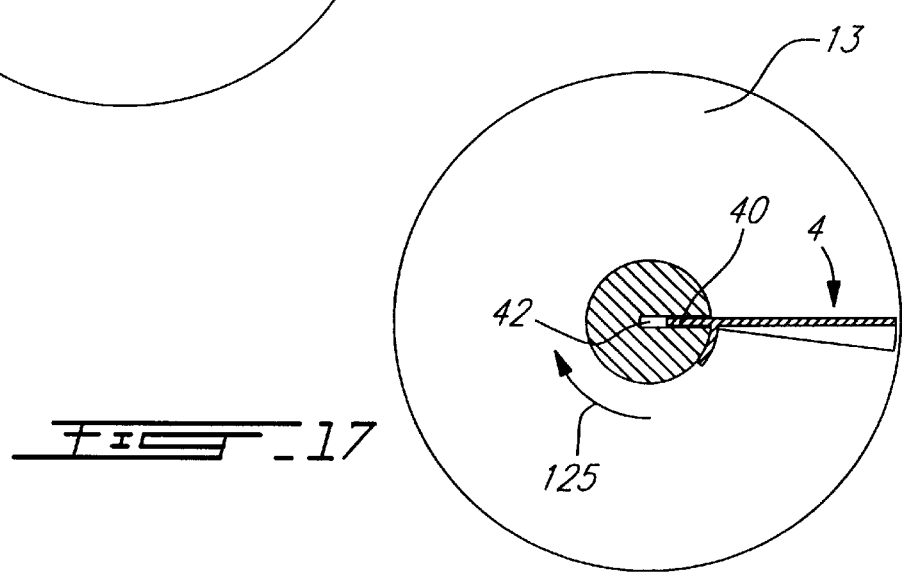
Figure 18:
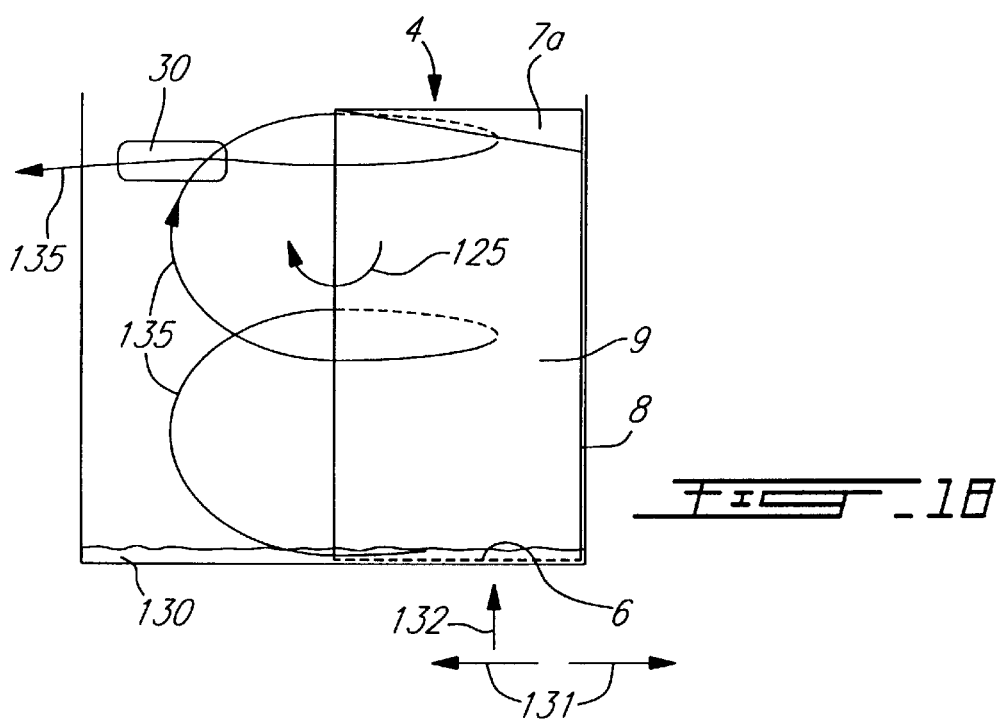
Figure 19:
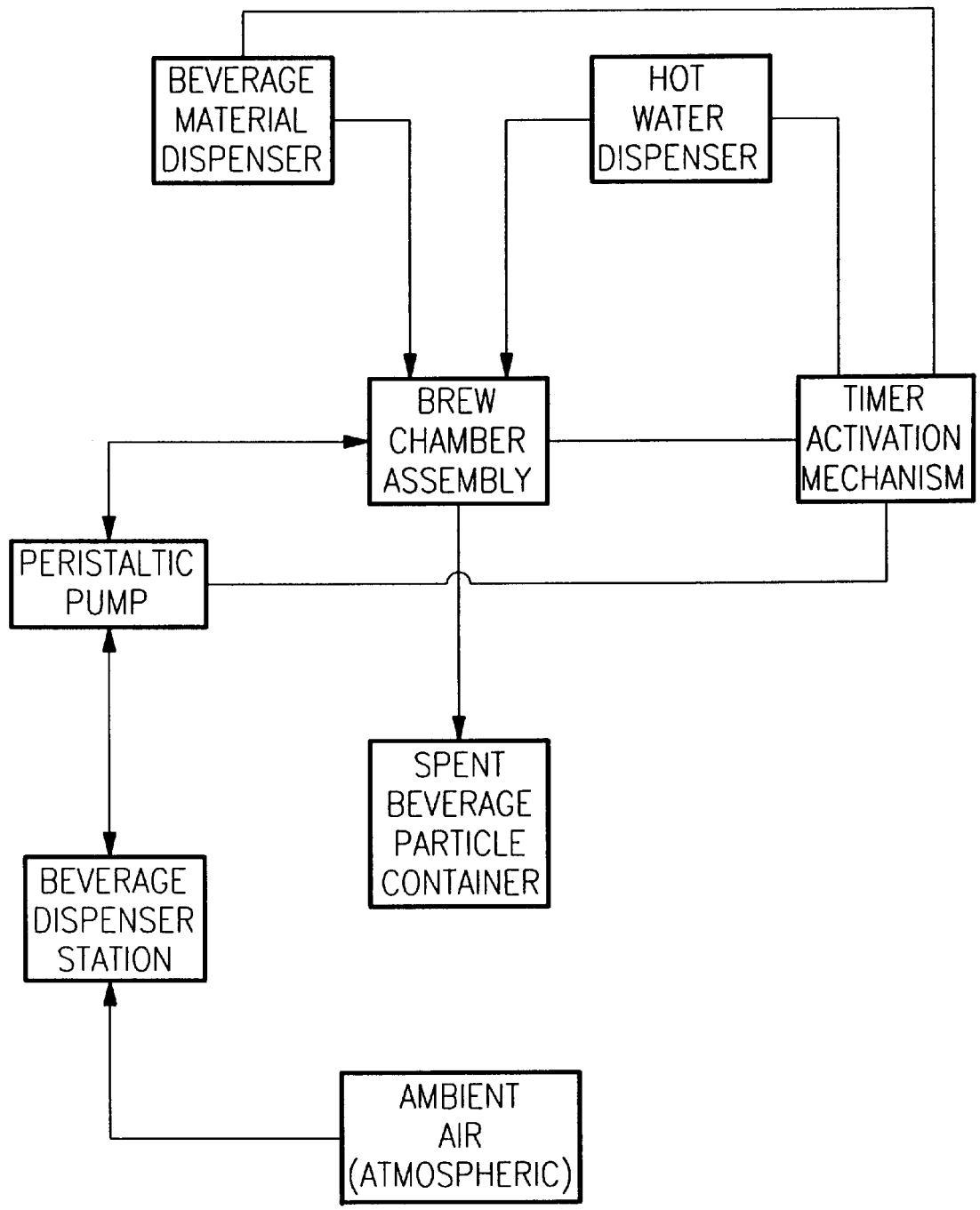

FIG. 11 a schematic side view of a top cap component for the brew chamber assembly shown in FIG. 1;

FIG. 12 is a schematic bottom view of the cap component shown in FIG. 11;

FIG. 12a is a schematic cross section view along 12a—12a of the cap component shown in FIG. 12;

FIG. 13 is a schematic side view of the brew chamber assembly shown in FIG. 1 combined with the cap component shown in FIG. 11;

FIG. 14 is a schematic side view of an alternate version of the brewing vessel shown in FIG. 1 wherein the side wall opening is below the brew line;

FIG. 15 is a schematic side view of the brewing vessel shown in FIG. 14 associated with an example plug means;

FIG. 16 is a schematic top view of a brew chamber assembly as shown in FIG. 3 wherein the hub and impellor blade are partially cut away and the impellor is in a retracted position;

FIG. 17 is a schematic top view of a brew chamber assembly as shown in FIG. 3 wherein the hub and impellor blade are partially cut away and the impellor is in an extended position FIG. 18 is a schematic pictorial side view of a brew chamber assembly of the present invention showing the radial and upward motion of particles when the impellor is being spun;

FIG. 19 is a block diagram of a system or apparatus exploiting a brewing chamber assembly of the present invention;

FIG. 20 is a pictorial representation of an apparatus exploiting a brewing chamber assembly in accordance with the present invention.

It is to be understood that the drawings only show in detail an example brew chamber assembly of the present invention. Other components of a brewer system (such as the hot water and ground coffee supply means, conventional coffee cup dropper mechanism, control means for the control and operation of the ingredient supply means, fluid displacement means, etc . . . the structure of the dispensing station, if desired, conventional coin-controlled means for activating the apparatus, timer mechanisms for controlling the brew cycle, etc . . . ) are known in the art and will thus not be particularly described herein.

Particular example embodiments of the invention will hereinafter be described in more detail with reference to the figures; the same reference numerals will be used to designate the same elements.

Turning to FIGS. 1 to 8, the brewer chamber assembly 1 has a brewing vessel which has a side wall 2 and a floor 3. The brewer chamber assembly 1 also has an impellor blade 4 and a rotatable hub 5. The impellor blade 4 has an inperforate body 5a which extends radially from the hub 5. The blade body 5a has a lower leading edge 6, a trailing upper edge 7 and a radial side edge 8 (the side edge 8 spirling upwardly gently from the lower edge to the upper edge). The blade body has a sloped working surface 9 which is sloped away from the direction of working rotation such that when the impellor blade is rotated about axis 10 in the clockwise working direction (see arrow 11) the blade body 5a presents a plow-like configuration to spent particulate beverage material (not shown) disposed on the floor 3. The impellor blade is also provided with a particle deflector element 7a which projects in the working rotational direction from the top trailing edge 7. The deflector element 7a is angled downwardly at any desired or suitable angle for facilitating the venting of particles out of the brewing vessel via a side wall opening.

The floor 3 is configured as a filter means which is air permeable and comprises a perforated plate 12 and a suitable wire mesh screen 13 (i.e. filter screen) disposed on top of the plate 12; the plate 12 has a plurality of holes, only one of which is designated by the reference numeral 15. The floor 3 also defines the top wall of a lower compartment the volume of which is designated with the reference numeral 17. The lower compartment has an opening means comprising a tube connector extension 18; the opening means serves for the introduction of air into the compartment for subsequent transfer through the floor 3 for agitation of steeping mixture in the vessel volume 19 and for the evacuation of beverage filtered through the floor in the opposite direction to the agitation air.

The hub is rotatably mounted on a teflon coated projection 21; the projection 21 has a cone-like depression which mates with a correspondingly shaped male projection of the hub 5. The hub 5 also has a D-shaped keying opening 24 at the opposite upper end thereof for engaging a correspondingly shaped male end part of a shaft connected to an electric motor (not shown).

The brewing vessel is shown as having a brewing level 27, i.e. the maximum level that the steeping mixture is intended to have for the illustrated brewing vessel. The side wall 2 of the brewing vessel also defines a side wall exit opening 30 which is disposed sufficiently high above the brew line 27 that for practical purposes no plug means is needed to plug the opening 30 during a steeping cycle with suitable air agitation; it is of course to be understood that the air agitation is only what is reasonable for mixing purposes and would generally not induce frothing bubbles which would rise to the level of the opening 30 and spill out of the opening 30 (please see U.S. Pat. No. 5,309,820 for more particulars with respect to air agitation). The side wall opening 30 is also positioned relative to the deflection element 7a such that the deflection element 7a may facilitate the deflection of particles to the side opening 30. The side opening 30 may be sized larger or smaller depending on the desired speed of elimination of the spent particles from the brewing vessel; the opening may have sloped edges to inhibit the sticking of particle thereto.

Referring to FIGS. 2, 3 and 4 the upper inner surface portion of the brewing vessel is provided with screw thread elements designated generally by the reference numeral 35 for the screw attachment thereto of a top cap component or element which shall be described below with respect to FIGS. 11, 12 and 13.

Figure 5:
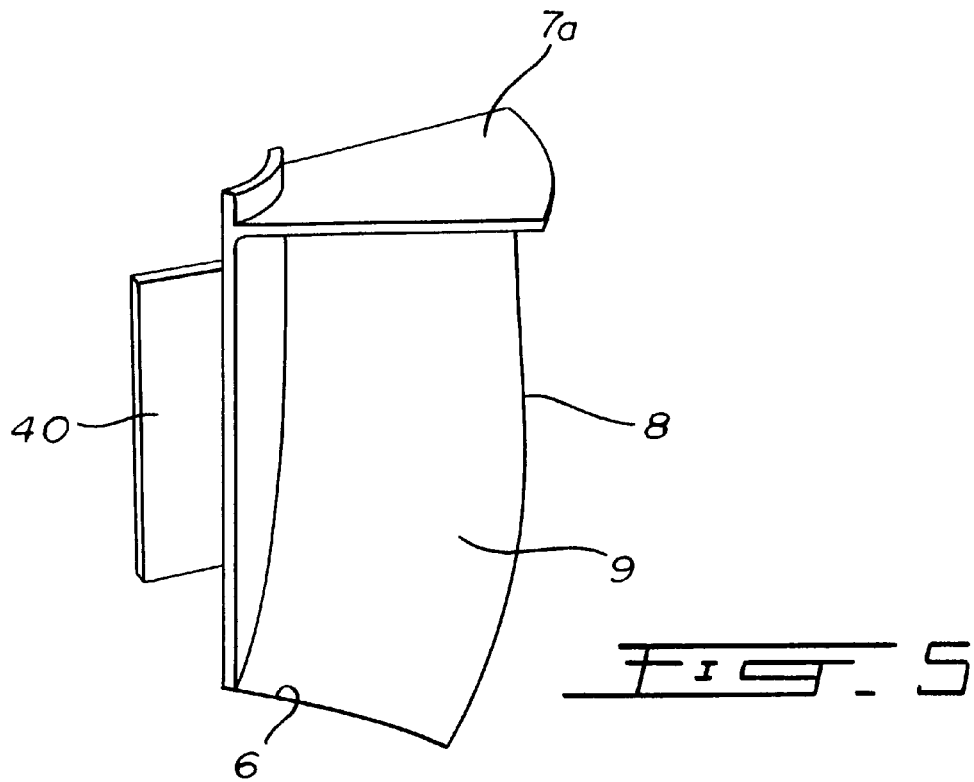
FIG. 5 is a side view showing the working surface of the impellor blade shown in FIG. 1.
Figure 6:
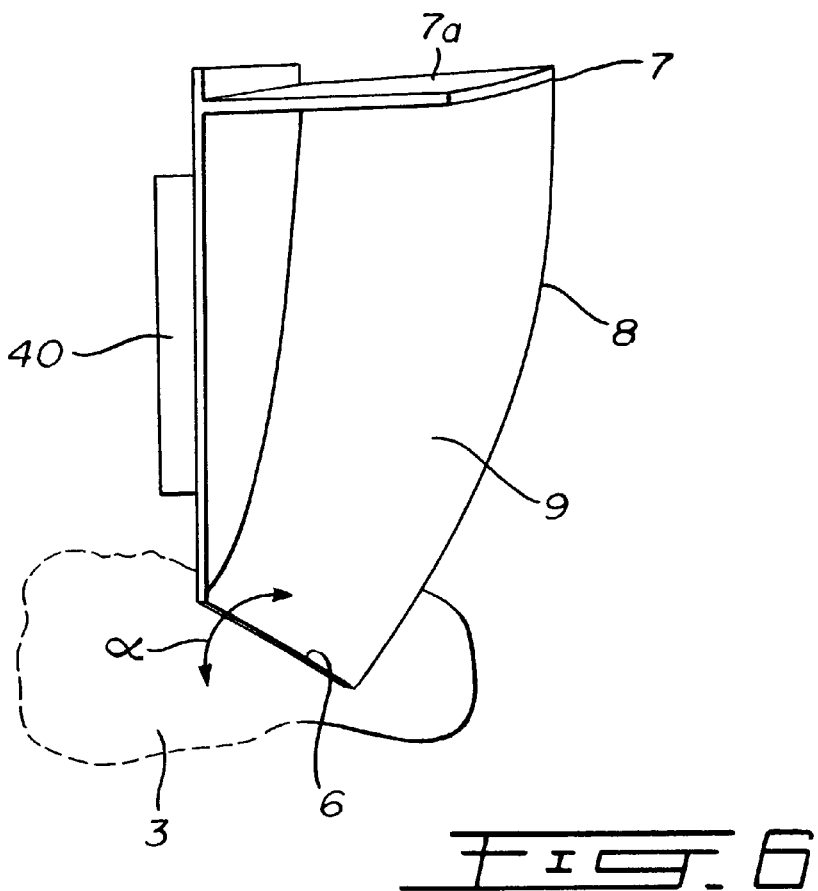
FIG. 6 is a radial side edge view of the impellor blade shown in FIG. 5.

Referring to FIG. 6 the working surface 9 of the blade body 5a may along with the surface of the floor 3 define an angle of, for example, greater than 90° and less than 180° (see angle α in FIG. 6).

Referring to FIGS. 5, 6, 7 and 8, these figures illustrates the means by which the impellor blade engages the hub 5 such that the impellor blade has a radial freedom of movement between an extended position wherein the side edge 8 engages the side wall 2 and a retracted position wherein the side edge 8 is spaced apart from the side wall.

Figure 7:
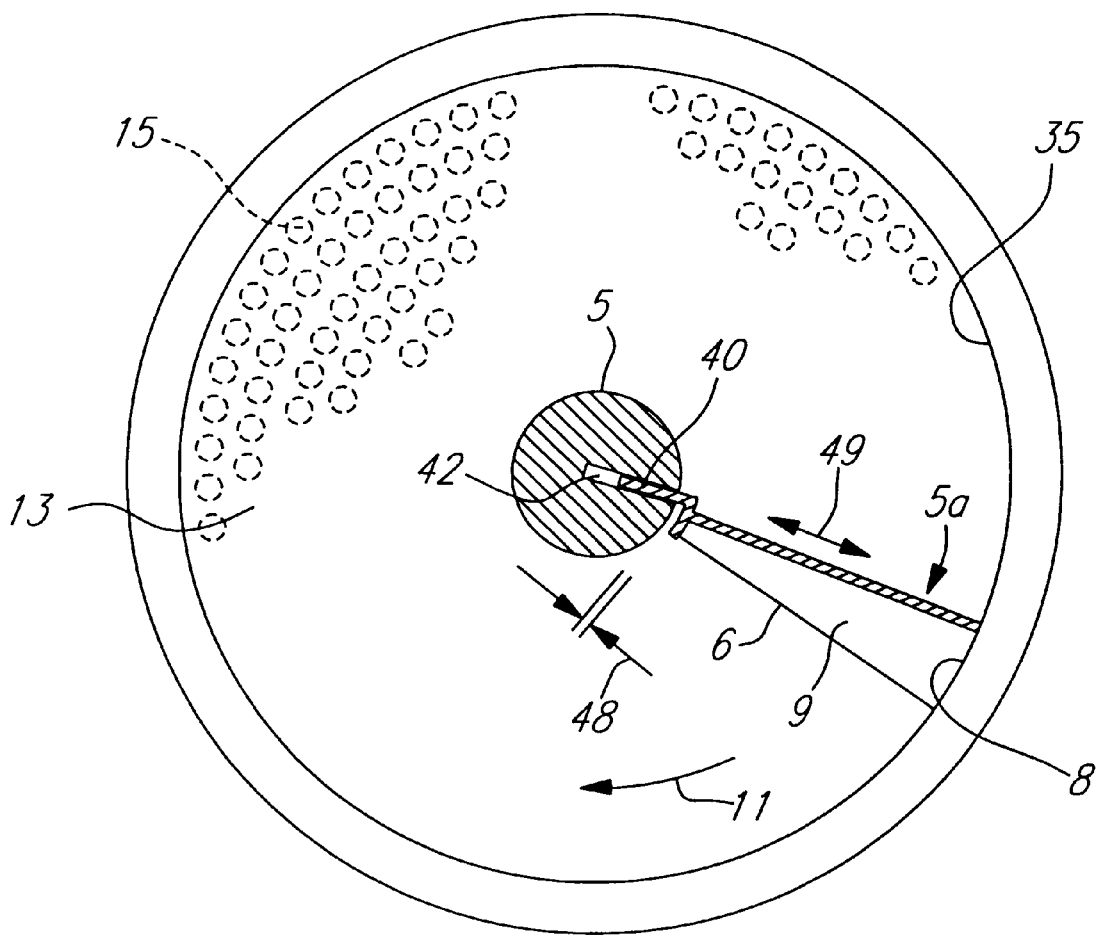
FIG. 7 is a top view of the brew chamber assembly shown in FIG. 3 wherein the hub and impellor blade are partially cut away.

Referring in particular to FIG. 7 the blade body 5a is shown in an extended position (see also FIGS. 2 and 3). The impellor blade has a rectangular-like finger or tab member 40 which is slidingly engageable in a central slot 42 of the hub 5; as may be seen the slot 42 does not extend over the full longitudinal length of the hub 5 but stops short of the opposed ends thereof. The radial length of the blade body 9 is sized somewhat smaller than the radial distance between the outer surface of the hub 5 and the inner surface of the side wall 2 so as to leave or provide for a play 48 between the blade body 5a and the outer surface of the hub 5. The presence of this play 48 allows the spinning blade to automatically adjust in the direction of the arrow 49 for deviations in the radius of the inner surface of the side wall 2 of the brewing vessel.

FIGS. 9 and 10 show alternative mechanisms by which the impellor blade may adjust for deviations in the radius of the inner surface of the side wall. In FIG. 9 the slot 42 is additional provided with a spring element 50 which biases the blade body in the extended position, i.e. the spring 50 biases the impellor blade in the direction of the arrow 51. In FIG. 10 the side edge of the blade body is provided with a flexible rubber like wiper element 55 which may flex to adjust for the above mentioned deviations.

Referring to FIGS. 11 and 12, these figures illustrate an example of a top cap component for the brew chamber assembly shown in FIG. 1. The cap component 60 has an outer ring flange 62, and an inner ring element 65 defining an U-shaped open channel, the ring element 65 has an annular opening 66 which is intended to open downwardly when the cap component is in place on the brew chamber assembly of FIG. 1 (see FIG. 13). The ring element 65 is also provided with a wall or blocking element 70 and a water inlet member 72. As may be seen from FIGS. 11 and 12 hot water for brewing may be introduced into the brewing vessel via inlet member 72. The hot water 79 may be introduced under suitable pressure such that some of it circulates around the channel of ring element 65 (see arrows 80) until reaching the blocking wall 70 and also downwardly (see arrows 82) so as to provide a rinsing action with respect to the (inner surface) of the side wall. The blocking wall 70 is so disposed that once the cap component is in place on the brewing chamber assembly in inhibits water from flowing down the side wall in the area of the side wall opening 30.

The cap component 60 also has a motor housing 85 for housing an electric motor for inducing rotation of the impellor blade. The housing is disposed off to one side of the center of the cap component so that a gearing element (not shown) disposed therein links the motor to the D-shaped male drive pin 90. The drive pin 90 is configured to operatively engage the D-shaped keying opening 24 of the hub 5 so that the motor once activated or energised may induce rotation of the hub impellor blade combination; if desired a spring element may be associated with the pin 90 for biasing the hub downward towards the floor when the cap component is in place on the brewing vessel upper top opening. The motor housing 85 is held in place with respect to the inner ring element 65 by support members 87, 88 and 89 so as to define openings 95, 96 and 97 which may be used for the introduction of the particulate beverage material (e.g. coffee grounds) into the brewing vessel.

Referring to FIG. 11 the lower part of the inner ring element includes screw threaded elements indicated generally by the reference numeral 100; the screw thread elements 100 are configured to cooperate with the screw thread elements 35 of the brewing vessel so that the cap component 60 may be screwed into place on the brew chamber assembly. The threshold elements 35 and 100 may for example be threaded such that the spin of the motor will tend to tighten the cap component 60 in place (i.e. a clockwise thread with a clock-wise rotation).

FIGS. 14 and 15 illustrate an alternate position for a side wall opening and an example plug mechanism therefore. As may be seen from FIG. 14 the side wall opening 105 is below the brewing line 27. Accordingly this version of the brew chamber assembly has a plug element indicated generally by the reference numeral 107. The plug element 107 has a projection 109 which is sized to just fit into the opening 106; a gasket element 110 surrounds the projection 109 so as to promote a fluid tight engagement between the plug element 107 and the side wall opening during the steeping step. The plug element 107 may be displaced in any suitable or required fashion between a plug configuration wherein the opening 106 is blocked off and an open configuration wherein the opening 106 is unblocked for venting the spent particle out of the brewing vessel. FIG. 15 shows an example of a possible plug arrangement for displacing the plug element 107 between the plug and open configurations. The plug mechanism has a pair of spaced rail members 114 and 115; the plug element 107 is connected to guide slots in these members by suitable pin members; the plug element 107 is also connected to an activation arm 119; the activation arm 119 is in turn suitable connected to the shaft of a motor 120 such that rotation of the motor shaft in one direction will induce movement of the plug element 107 to one said configuration and rotation in the opposite direction will induce movement to the other configuration.

Referring to FIGS. 16 and 17, FIG. 16 shows the impellor blade 4 in a retracted position, e.g. when the hub is not rotating. FIG. 17 shows the impellor blade 4 in an extended position, e.g. when the hub is spinning clockwise in the working direction of the arrow 125 at a suitable rotational speed (e.g. at about 900 rpm). Referring to FIG. 18, this figure shows the brew chamber assembly with spent particulate beverage material 130 disposed on the floor thereof. The particles once the impellor blade 4 is made to spin in the direction of the arrow 125 are initially lifted off of the floor by the lower leading edge 6. Thereafter the spinning impellor blade (in conjunction with the side wall of the brewing vessel) imparts to the particles of spent beverage material an outward radial movement in the direction of the arrows 131 and an upward movement in the direction of the arrow 132; for illustration purposes only the venting movement of the particles out the side wall opening 30 is shown by the line arrow 135. As may be seen the deflection element 7a is configured so as to be able to interrupt the natural upward movement of the particles and deflect them towards the side wall at the level of the opening 30 so as to facilitate the venting thereof out of the side wall opening 30. It is of course to be understood that the deflection element a may be dispensed with, in which case the cap component 60 would be suitably configured so as to provide a venting path for the upwardly moving particles, i.e. a selective opening through which the particles may be directed to a waste container.

It is also to be understood that the impellor may be made to rotate at a suitable reduced speed to participate in the agitation of the steeping mixture.

FIG. 19 illustrates in block form the various elements of a system or apparatus for the brewing of a beverage from an insoluble particulate beverage material, including a control means comprising a timer activation mechanism; the timer activation mechanism may be mechanical and/or electronically based (e.g. using known control techniques).

Referring to FIG. 20, an example embodiment of a brewing apparatus in accordance with the present invention is shown schematically. The side wall opening of the brew chamber assembly is in communication with path means 137 which delivers the spent particles to a waste container 138.

The apparatus has a fluid displacement means in the form of a peristaltic pump indicated generally by the reference number 140.

The peristaltic pump 140 is operated by a (if desired, variable speed) reversible motor (not shown), i.e. the shaft of the motor can be made to rotate the squeeze rollers in clockwise (arrow 142) or anticlockwise (arrow 143) fashion.

A tubing component interlinks the brewing vessel 1, the peristaltic pump 140, the flow control station 145 and the dispensing station 150; the various tube sections or element of the tubing component are designated with the reference numeral 155.

The tubing 155 of elastic material passes through the peristaltic pump 140.

A counterclockwise rotation (143) of the roller assembly of the pump will suck fluid (e.g. beverage) into the pump from the brewing vessel and expel it out into the flow control station 145. The inlet opening 160 of the station 145 is larger than the outlet opening 165 thereof; accordingly, the beverage will tend to backup in the station 145 so as to provide a more steady flow of beverage from the station 145 to the dispensing station 150.

On the other hand a clockwise (142) rotation of the roller assembly of the pump will suck atmospheric air through the pump from the dispensing station 150 on into the lower compartment communicating with the brewing vessel through the floor thereof.

In accordance with the apparatus shown in FIG. 20 the single reversible peristaltic pump induces air agitation or beverage evacuation depending on the direction of rotation of the roller assembly therein. The tube component 155 preferably is as short as possible to for example reduce heat loss through the tube walls. The tube 155 should also preferably be disposed so as to avoid U-shaped bends or other similar type beverage traps being set-up within the tube; for this purpose the interior of the tube may maintained in a vertical or vertically sloping position so that all the beverage may flow downwardly to the dispensing station.

The apparatus also includes a source or supply of coffee grounds 170 and a source or supply of hot water 175; the hot water source is connected to the ring 65 by a tube 177.

The operation of the brewing apparatus of FIG. 20 incorporating a brewing chamber assembly as seen in FIG. 1 will now be generally described.

The coffee source 170 dispenses a predetermined quantity of coffee into the brewer vessel (e.g. via opening 95) and the solenoid valve of the hot water supply 180 opens to allow a volume of hot water into the brewer vessel via the rinse ring 65 which causes this water to flow down the sides of the brewer's inside wall (for a rinse action).

When the two ingredients (coffee grounds and water) are in the brewer vessel, the peristaltic pump 140 begins rotating in the agitation direction (142) causing the coffee grounds and water to be air agitated. After a predetermined time the pump motor is made to reverse to the filtration direction (143). The coffee grounds remain on the filter floor of the brewing vessel while the coffee liquid is drawn under vacuum through the filter floor, through the pump and into the flow control station 145 (which slows down the flow of coffee to eliminate the squirting effect of the peristaltic pump and causes a more even pouring effect of the coffee delivery into a cup at the delivery station 150), and into the cup at the delivery station 150.

During the filtration phase, a small pre-determined percentage of the water volume is into the brewer vessel for rinsing the sides of the brewer to clean away grounds for subsequent venting out the side opening as described herein.

After delivery of the coffee solution into the consumer's cup, the impellor motor begins to turn, and the impellor blade by centrifuge is forced against the brewer vessel side wall. The shape and slope of the lower edge of the impellor blade facilitates the cleaning of the brewing vessel filter floor and forces the grounds up the sloped walls of the blade. The deflection element at the top of the blade presents a limiting ceiling to prevent the spent coffee grounds from rising above the top of the blade; the spent grounds under centrifuge have no choice but to exit through the side wall opening above the brew line.

Thereafter the brewing cycle may be recommenced as described above.

I claim:

1. A brew chamber assembly for an apparatus for preparing a beverage from an aqueous medium and an insoluble particulate beverage material, said brew chamber assembly comprising a brewing vessel, beverage evacuation means for the evacuation of beverage from said vessel so as to leave spent particulate beverage material behind in said vessel and spent particulate beverage material discharge means, said brewing vessel comprising side wall means and a floor, said spent particulate beverage material discharge means comprising exit means for venting spent particulate beverage material out of said brewing vessel and spinable impellor means for urging spent particulate beverage material out of said brewing vessel through said exit means, said brewing vessel and said spinable impellor means being configured such that when the impellor means is spun, in the brewing vessel, in a working direction, about an axis of rotation, the impellor means is able to induce spent particulate beverage material in said brewing vessel outwardly away from the axis of rotation and upwardly away from the floor so as to urge spent particulate beverage material out of said brewing vessel through said exit means and wherein said beverage evacuation means comprises said floor and at least a portion of said floor is configured as a filter for the evacuation of beverage from said vessel so as to leave spent particulate beverage material behind on said floor.

2. A brew chamber assembly as defined in claim 1 wherein said exit means comprises a side opening defined by said side wall means whereby said spent particulate beverage material may be vented out of said vessel.

3. A brew chamber assembly as defined in claim 2 wherein said side opening is disposed above a brewing level for the brewing vessel.

4. A brew chamber assembly as defined in claim 2 wherein said exit means comprises plug means displaceable between a plug configuration wherein the side opening is blocked for inhibiting the passage therethrough of aqueous medium and particulate material and an open configuration for venting spent particulate beverage material out of the brewing vessel through said side opening.

5. A brew chamber assembly as defined in claim 1 wherein the floor comprises a micromesh filter screen for recovering beverage from said vessel, said filter screen being permeable to air.

6. A brew chamber assembly as defined in claim 1 wherein said spinable impellor means comprises a hub rotatable about said axis of rotation and an impellor blade, said impellor blade comprising a imperforate blade body extending radially from said hub, said brewing vessel and said blade body being configured such that when the hub is spun, in the brewing vessel, in said working direction, about the axis of rotation the blade body is able to induce spent particulate beverage material in said brewing vessel to move outwardly away from the axis of rotation and upwardly away from the floor so as to urge spent particulate beverage material out of said brewing vessel through said exit means.

7. A brew chamber assembly as defined in claim 6 wherein said exit means comprises a side opening defined by said side wall means whereby spent particulate beverage material may be vented out of said vessel and wherein said impellor means comprises particulate deflection means, said deflection means extending from said imperforate blade body and being disposed and configured such that when the hub is spun about the axis of rotation in said working direction, the deflection means is able to deflect spent particulate beverage material to said side opening.

8. A brew chamber assembly as defined in claim 7 wherein said imperforate blade body comprises a lower leading edge, an upper trailing edge, and a radial outer side edge disposed between said upper and lower edges, said radial outer side edge being configured for sweeping spent particulate beverage material off of said side wall means, said deflection means extending from said upper trailing edge.

9. A brew chamber assembly as defined in claim 8 wherein said impellor means is configured such that at least a portion of said blade body has a radial freedom of movement between an extended position wherein the radial outer side edge engages the side wall means and a retracted position wherein the radial outer side edge is spaced apart from the side wall means and such that when said impellor means is spun the centrifugal force induced urges the radial outer side edge to said extended position.

10. A brew chamber assembly as defined in claim 8 wherein said impellor means comprise spring bias means and is configured such that at least a portion of said blade body has a radial freedom of movement between an extended position wherein the radial out side edge engages the side wall means and a retracted position wherein the radial outer side edge is spaced apart from the side wall means, said portion of said blade body being biased in said extended position by said spring bias means.

11. A brew chamber assembly as defined in claim 8 wherein said blade body engages said hub so as to have a radial freedom of movement between an extended position wherein the radial outer side edge engages the side wall means and a retracted position wherein the radial outer side edge is spaced apart from the side wall means and such that when said impellor is spun the centrifugal force induced urges the radial outer side edge to said extended position.

12. A brew chamber assembly as defined in claim 8 wherein said impellor means comprises spring bias means and wherein said blade body engages said hub so as to have a radial freedom of movement between an extended position wherein the radial outer side edge engages the side wall means and a retracted position wherein the radial outer side edge is spaced apart from the side wall means, said blade body being biased in said extended position by said spring bias means.

13. A brew chamber assembly as defined in claim 11 wherein said side opening is disposed above a brewing level for the brewing vessel.

14. A brew chamber assembly as defined in claim 1 wherein said exit means comprises a side opening defined by said side wall means whereby said spent particulate beverage material may be vented out of said vessel and wherein said spinable impellor means comprises a hub rotatable about said axis of rotation, a single impellor blade and particulate deflection means, said impellor blade comprising an inperforate blade body extending radially from said hub, said blade body comprising a lower leading edge for sweeping spent particulate beverage material off of said floor, an upper trailing edge, and a radial outer edge disposed between said upper and lower edges for sweeping spent particulate beverage material off of said side wall means, said brewing vessel and said blade body being configured such that when the hub is spun, in the brewing vessel, in said working direction, about the axis of rotation, the blade body is able to induce spent particulate beverage material swept up by said lower edge when said hub is spun, to move outwardly away from the axis of rotation and upwardly away from the floor so as to urge spent particulate beverage material out of said brewing vessel through said exit means, said deflection means extending from the upper trailing edge of said imperforate blade body and being disposed and configured such that when the hub is spun about the axis of rotation in said working direction, the deflection means is able to deflect spent particulate beverage material to said side opening.

15. A brew chamber assembly as defined in claim 14 wherein said blade engages said hub so as to have a radial freedom of movement between an extended position wherein the radial outer side edge engages the side wall means and a retracted position wherein the radial outer side edge is spaced apart from the side wall means and such that when said impellor is spun the centrifugal force induced urges the radial outer side edge to said extended position.

16. A brew chamber assembly as defined in claim 15 wherein said side opening is disposed above a brewing level for the vessel.

17. A brew chamber assembly as defined in claim 1 for an apparatus for preparing a beverage from an aqueous medium and a particulate beverage material, said apparatus operating with a brewing cycle including the air agitation of a mixture of the aqueous medium and the particulate beverage material in said brewing vessel, wherein said floor of said brewing vessel defines a top wall of a lower compartment, at least a portion of the top wall being configured as a filter for the evacuation of beverage from said vessel and being permeable to air, said compartment having opening means for the entry of air thereinto and for the exit of beverage therefrom.

18. A brew chamber assembly as defined in claim 17 wherein said top wall comprises a perforated base and filter means for recovering beverage from said vessel, said filter means being permeable to air and covering the perforations of said base and wherein filter means comprises a micromesh filter screen for recovering beverage from said vessel, said filter screen being permeable to air.

19. A brew chamber assembly as defined in claim 16 for an apparatus for preparing a beverage from an aqueous medium and a particulate beverage material, said apparatus operating with a brewing cycle including the air agitation of a mixture of the aqueous medium and the particulate beverage material in said brewing vessel, wherein said floor of said brewing vessel defines a top wall of a lower compartment, at least a portion of the top wall being configured as a filter for the evacuation of beverage from said vessel and being permeable to air, said compartment having opening means for the entry of air thereinto and for the exit of beverage therefrom.

20. A brew chamber assembly as defined in claim 19 wherein said top wall comprises a perforated base and filter means for recovering beverage from said vessel, said filter means being permeable to air and covering the perforations of said base and wherein filter means comprises a micromesh filter screen for recovering beverage from said vessel, said filter screen being permeable to air.

21. A system for preparing a beverage from an aqueous medium and an insoluble particulate beverage material, said system operating with a brewing cycle including air agitation of a mixture of the aqueous medium and the particulate beverage material in a brewing vessel, said system comprising a brewing vessel comprising side wall means and a floor, said floor defining a top wall of a lower compartment, at least a portion of said top wall being configured as a filter for the evacuation of beverage from said vessel so as to leave spent particulate beverage material behind on said floor and being permeable to air, said compartment having opening means for the entry of air thereinto and for the exit of beverage therefrom, means for supplying particulate beverage material into said brewing vessel means for supplying an aqueous medium into said brewing vessel fluid displacement means for withdrawing obtained beverage from the brewing vessel through said floor so as to leave spent particulate beverage material behind on said floor, spent particulate beverage material discharge means comprising exit means for venting spent particulate beverage material out of said brewing vessel and spinable impellor means for urging spent particulate beverage material out of said brewing vessel through said exit means, said brewing vessel and said spinable impellor means being configured such that when the impellor means is spun, in the brewing vessel, in a working direction, about an axis of rotation, the impellor means is able to induce spent particulate beverage material in said brewing vessel to move outwardly away from the axis of rotation and upwardly away from the floor so as to urge spent particulate beverage material out of said brewing vessel through said exit means.

22. A system as defined in claim 21 wherein said exit means comprises a side opening defined by said side wall means whereby said spent particulate beverage material may be vented out of said vessel.

23. A system as defined in claim 22 wherein said side opening is disposed above a brewing level for the brewing vessel.

24. A system as defined in claim 22 wherein said exit means comprises plug means displaceable between a plug configuration wherein the side opening is blocked for inhibiting the passage therethrough of aqueous medium and particulate material and an open configuration for venting spent particulate beverage material out of the brewing vessel through said side opening.

25. A system as defined in claim 21 wherein the floor comprises a micromesh filter screen for recovering beverage from said vessel, said filter screen being permeable to air.

26. A system as defined in claim 22 wherein said spinable impellor means comprises a hub rotatable about said axis of rotation and an impellor blade, said impellor blade comprising an imperforate blade body extending radially from said hub, said brewing vessel and said blade body being configured such that when the hub is spun, in the brewing vessel, in said working direction, about the axis of rotation, the blade body is able to induce spent particulate beverage material in said brewing vessel to move outwardly away from the axis of rotation and upwardly away from the floor so as to urge spent particulate beverage material out of said brewing vessel through said exit means.

27. A system as defined in claim 26 wherein said exit means comprises a side opening defined by said side wall means whereby spent particulate beverage material may be vented out of said vessel and wherein said impellor means comprises particulate deflection means, said deflection means extending from said imperforate blade body and being disposed and configured such that when the hub is spun about the axis of rotation in said working direction, the deflection means is able to deflect spent particulate beverage material to said side opening.

28. A system as defined in claim 27 wherein said imperforate body comprises a lower leading edge, an upper trailing edge, and a radial outer side edge disposed between said upper and lower edges, said radial outer side edge being configured for sweeping spent particulate beverage material off of said side wall means, said deflection means extending from said upper edge.

29. A system as defined in claim 28 wherein said impellor means is configured such that at least a portion of said blade body has a radial freedom of movement between an extended position wherein the radial outer side edge engages the side wall means and a retracted position wherein the radial outer side edge is spaced apart from the side wall means and such that when said impellor means is spun the centrifugal force induced urges the radial outer side edge to said extended position.

30. A system as defined in claim 28 wherein said impellor means comprise spring bias means and is configured such that at least a portion of said blade body has a radial freedom of movement between an extended position wherein the radial outer side edge engages the side wall means and a retracted position wherein the radial outer side edge is spaced apart from the side wall means, said portion of said blade body being biased in said extended position by said spring bias means.

31. A system as defined in claim 28 wherein said blade engages said hub so as to have a radial freedom of movement between an extended position wherein the radial outer side edge engages the side wall means and a retracted position wherein the radial outer side edge is spaced apart from the side wall means and such that when said impellor is spun the centrifugal force induced urges the radial outer side edge to said extended position.

32. A system as defined in claim 28 wherein said impellor means comprises spring bias means and wherein said blade engages said hub so as to have a radial freedom of movement between an extended position wherein the radial outer side edge engages the side wall means and a retracted position wherein the radial outer side edge is spaced apart from the side wall means, said blade being biased in said extended position by said spring bias means.

33. A system as defined in claim 31 wherein said side opening is disposed above a brewing level for the brewing vessel.

34. A system as defined in claim 21 wherein said exit means comprises a side opening defined by said side wall means whereby said spent particulate beverage material may be vented out of said vessel and wherein said spinable impellor means comprises a hub rotatable about said axis of rotation, a single impellor blade and particulate deflection means, said impellor blade comprising a imperforate blade body extending radially from said hub, said blade body comprising a lower leading edge for sweeping spent particulate beverage material off of said floor, an upper trailing edge, and a radial outer edge disposed between said upper and lower edges for sweeping spent particulate beverage material off of said side wall means, said brewing vessel and said blade body being configured such that when the hub is spun, in the brewing vessel, in said working direction, about the axis of rotation, the blade body is able to induce spent particulate beverage material swept up by said lower edge when said hub is spun to move outwardly away from the axis of rotation and upwardly away from the floor so as to urge spent particulate beverage material out of said brewing vessel through said exit means, said deflection means extending from the upper trailing edge of said imperforate blade body and being disposed and configured such that when the hub is spun about the axis of rotation in said working direction, the deflection means is able to defect spent particulate beverage material to said side opening.

35. A system as defined in claim 34 wherein said blade engages said hub so as to have a radial freedom of movement between an extended position wherein the radial outer side edge engages the side wall means and a retracted position wherein the radial outer side edge is spaced apart from the side wall means and such that when said impellor is spun the centrifugal force induced urges the radial outer side edge to said extended position.

36. A system as defined in claim 35 wherein said side opening is disposed above a brewing level for the vessel.

37. An apparatus for preparing a beverage from an aqueous medium and an insoluble particulate beverage material, said apparatus having
  a brewing vessel comprising side wall means and a floor, said floor defining a top wall of a lower compartment, at least a portion of said top wall being configured as a filter for the evacuation of beverage from said vessel so as to leave spent particulate beverage material behind on said floor and being permeable to air, said compartment having opening means for the entry of air thereinto and for the exit of beverage therefrom
  supply means for supplying aqueous medium and said particulate beverage material to said vessel,
  fluid displacement means for forcing air into the brewing vessel through said floor and for withdrawing obtained beverage from the brewing vessel through said floor,
  a dispensing station for dispensing beverage
  spent particulate beverage material discharge means comprising exit means for venting spent particulate beverage material out of said brewing vessel and spinable impellor means for urging spent particulate beverage material out of said brewing vessel through said exit means, said brewing vessel and said spinable impellor means being configured such that when the impellor means is spun, in the vessel, in a working direction, about an axis of rotation, the impellor means is able to induce spent particulate beverage material in said brewing vessel outwardly away from the axis of rotation and upwardly away from the floor so as to urge spent particulate beverage material out of said brewing vessel through said exit means
  and
  control means for controlling the supply means, said fluid displacement means and said spent particulate beverage material discharge means to effect a brewing cycle, said brewing cycle comprising supplying aqueous medium and particulate beverage material to the brewing vessel, forcing air through said floor to agitate a mixture of beverage material and aqueous medium in the brewing vessel, drawing the obtained beverage from the vessel through said floor, and venting spent particulate beverage material out of said brewing vessel,
  and wherein
  the fluid displacement means comprises one or more positive displacement rotary pump means, each said pump means having a flexible pumping member, at least one said pump means being operatively connected to said opening means of said compartment and to an air source for forcing air through said common wall into said vessel, at least one said pump means being operatively connected to said opening means of said compartment and to the dispensing station for withdrawing obtained beverage from the vessel through said top wall for delivery to said dispensing station, and
  said control means includes means for selectively activating said pump means to force air into said brewing vessel through said common wall, for selectively activating said pump means for withdrawing beverage from said vessel through said top wall and for selectively activating said spinable impellor means for urging spent particulate beverage material out of said brewing vessel through said exit means.

38. An apparatus as defined in claim 37 wherein said fluid displacement means is reversible and comprises a peristaltic pump, said pump being operatively connected on one side thereof to said opening of said compartment and on the other side thereof to an air source and to the dispensing station, and
  said control means includes means for selectively activating said pump to force air into said brewing vessel through said top wall and selectively activating said pump for reverse operation for withdrawing beverage from said brewing vessel through said top wall for delivery to said dispensing station.

39. A apparatus as defined in claim 37 wherein said exit means comprises a side opening defined by said side wall means whereby said spent particulate beverage material may be vented out of said vessel.

40. A apparatus as defined in claim 39 wherein said side opening is disposed above a brewing level for the brewing vessel.

41. A apparatus as defined in claim 39 wherein said exit means comprises plug means displaceable between a plug configuration wherein the side opening is blocked for inhibiting the passage therethrough of aqueous medium and particulate material and an open configuration for venting speed particulate beverage material out of the brewing vessel through said side opening.

42. A apparatus as defined in claim 39 wherein the floor comprises a micromesh filter screen for recovering beverage from said vessel, said filter screen being permeable to air.

43. A apparatus as defined in claim 39 wherein said spinable impellor means comprises a hub rotatable about said axis of rotation and an impellor blade, said impellor blade comprising an inperforate blade body extending radially from said hub, said brewing vessel and said blade body being configured such that when the hub is spun, in the brewing vessel, in said working direction, about the axis of rotation, the blade body is able to induce spent particulate beverage material in said brewing vessel to move outwardly away from the axis of rotation and upwardly away from the floor so as to urge spent particulate beverage material out of said brewing vessel through said exit means.

44. A apparatus as defined in claim 43 wherein said exit means comprises a side opening defined by said side wall means whereby spent particulate beverage material may be vented out of said vessel and wherein said impellor means comprises particulate deflection means, said deflection means extending from said imperforate blade body and being disposed and configured such that when the hub is spun about the axis of rotation in said working direction, the deflection means is able to deflect spent particulate beverage material to said side opening.

45. A apparatus as defined in claim 44 wherein said imperforate blade body comprises a lower leading edge, an upper trailing edge, and a radial outer side edge disposed between said upper and lower edges, said radial outer side edge being configured for sweeping spent particulate beverage material off of said side wall means, said deflection means extending from said upper edge.

46. A apparatus as defined in claim 45 wherein said impellor means is configured such that at least a portion of said blade body has a radial freedom of movement between an extended position wherein the radial outer side edge engages the side wall means and a retracted position wherein the radial outer side edge is spaced apart from the side wall means and such that when said impellor means is spun the centrifugal force induced urges the radial outer side edge to said extended position.

47. A apparatus as defined in claim 45 wherein said impellor means comprise spring bias means and is configured such that at least a portion of said blade body has a radial freedom of movement between an extended position wherein the radial outer side edge engages the side wall means and a retracted position wherein the radial outer side edge is spaced apart from the side wall means, said portion of said blade body being biased in said extended position by said spring bias means.

48. A apparatus as defined in claim 45 wherein said blade engages said hub so as to have a radial freedom of movement between an extended position wherein the radial outer side edge engages the side wall means and a retracted position wherein the radial outer side edge is spaced apart from the side wall means and such that when said impellor is spun the centrifugal force induced urges the radial outer side edge to said extended position.

49. A apparatus as defined in claim 45, wherein said impellor means comprises spring bias means and wherein said blade engages said hub so as to have a radial freedom of movement between an extended position wherein the radial outer side edge engages the side wall means and a retracted position wherein the radial outer side edge is spaced apart from the side wall means, said blade being biased in said extended position by said spring bias means.

50. A apparatus as defined in claim 48 wherein said side opening is disposed above a brewing level for the brewing vessel.

51. A apparatus as defined in claim 37, wherein said exit means comprises a side opening defined by said side wall means whereby said spent particulate beverage material may be vented out of said vessel and wherein said spinable impellor means comprises a hub rotatable about said axis of rotation, a single impellor blade particulate beverage material to said hub and particulate deflection means, said impellor blade comprising a radially extending imperforate blade body, said blade body comprising a lower leading edge for sweeping spent particulate beverage material off of said floor, an upper trailing edge, and a radial outer edge disposed between said upper and lower edges for sweeping spent particulate beverage material off of said side wall means, said brewing vessel and said blade body being configured such that when the hub is spun, in the brewing vessel, in said working direction, about the axis of rotation, the blade body is able to induce spent particulate beverage material swept up by said lower edge when said hub is spun to move outwardly away from the axis of rotation and upwardly away from the floor so as to urge spent particulate beverage material out of said brewing vessel through said exit means, said deflection means extending from the upper trailing edge of said imperforate blade body and being disposed and configured such that when the hub is spun about the axis of rotation in said working direction, the deflection means is able to deflect spent particulate beverage material to said side opening.

52. A apparatus as defined in claim 51 wherein said blade engages said hub so as to have a radial freedom of movement between an extended position wherein the radial outer side edge engages the side wall means and a retracted position wherein the radial outer side edge is spaced apart from the side wall means and such that when said impellor is spun the centrifugal force induced urges the radial outer side edge to said extended position.

53. A apparatus as defined in claim 52 wherein said side opening is disposed above a brewing level for the vessel.

* * * * *